United States Patent
Kuo

(10) Patent No.: US 8,494,062 B2
(45) Date of Patent: Jul. 23, 2013

(54) DEBLOCKING FILTERING APPARATUS AND METHOD FOR VIDEO COMPRESSION USING A DOUBLE FILTER WITH APPLICATION TO MACROBLOCK ADAPTIVE FRAME FIELD CODING

(75) Inventor: Chi-Chang Kuo, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 467 days.

(21) Appl. No.: 12/858,440

(22) Filed: Aug. 18, 2010

(65) Prior Publication Data

US 2011/0103490 A1 May 5, 2011

Related U.S. Application Data

(60) Provisional application No. 61/256,000, filed on Oct. 29, 2009.

(30) Foreign Application Priority Data

Feb. 26, 2010 (TW) .............................. 99105715 A

(51) Int. Cl.
*H04N 7/26* (2006.01)
(52) U.S. Cl.
USPC .................................................... 375/240.29
(58) Field of Classification Search
CPC ............ H04N 7/12; H04N 11/02; H04N 11/04
USPC ..................................................... 375/240.29
IPC ................................. H04N 7/12, 11/02, 11/04
See application file for complete search history.

(56) References Cited

U.S. PATENT DOCUMENTS

2006/0002477 A1 1/2006 Bae
2006/0078052 A1 4/2006 Dang
(Continued)

FOREIGN PATENT DOCUMENTS

JP 11339015 A * 12/1999
JP 2001134556 A * 5/2001
(Continued)

OTHER PUBLICATIONS

An Efficient Double-Filter Hardware Architecture for H.264/AVC Deblocking Filtering, Felix Tobajas, Gustavo M. Callico, Pedro A. Perez, Valentin de Armas, and Roberto Sarmiento, Consumer Electronics, IEEE Transactions, vol. 54, Issue: 1 pp. 131-139.*

(Continued)

*Primary Examiner* — Young Lee
*Assistant Examiner* — Francis G Geroleo
(74) *Attorney, Agent, or Firm* — Rabin & Berdo, P.C.

(57) ABSTRACT

A deblocking filtering apparatus for video compression performs edge-filtering of the boundaries of macroblocks for a series of images. The apparatus buffers the partial data required by a first and a second filters by using a first and a second swap buffers, and implements the buffering function with register groups to increase the flexibility of data exchange. The first and the second filters perform vertical and horizontal deblocking filtering for the macroblocks of the series of images, respectively. An adaptive queue is used to receive the portion of output data from the first filter, temporarily store the data in internal buffers, and output data to be as the portion of input data of the second filter.

18 Claims, 27 Drawing Sheets

U.S. PATENT DOCUMENTS

| | | | |
|---|---|---|---|
| 2006/0115002 A1 | 6/2006 | Kim et al. |
| 2006/0133504 A1 | 6/2006 | Jung et al. |
| 2006/0262990 A1 | 11/2006 | Lee et al. |
| 2007/0177669 A1 | 8/2007 | Kawashima et al. |
| 2007/0189735 A1 | 8/2007 | Kawashima et al. |
| 2007/0291857 A1 | 12/2007 | Hussain |
| 2007/0291858 A1 | 12/2007 | Hussain et al. |
| 2008/0043852 A1 | 2/2008 | Park et al. |
| 2008/0043853 A1 | 2/2008 | Kawa |
| 2008/0069247 A1 | 3/2008 | He |
| 2008/0123750 A1 | 5/2008 | Bronstein et al. |
| 2008/0225956 A1 | 9/2008 | Kusakabe |
| 2008/0298472 A1 | 12/2008 | Jain et al. |

FOREIGN PATENT DOCUMENTS

| | | |
|---|---|---|
| JP | 2002-077914 | 3/2002 |
| JP | 2006-174486 A | 6/2006 |
| JP | 2007-067945 | 3/2007 |
| JP | 2008-136187 | 6/2008 |
| JP | 2009-206714 | 9/2009 |
| TW | 200629909 | 8/2006 |

OTHER PUBLICATIONS

Taiwan Patent Office, Office Action, Patent Application Serial No. TW099105715, Nov. 23, 2012, Taiwan.

Cheng-An Chien et al., "A High Throughput Deblocking Filter Design Supporting Multiple Video Coding Standards," in processing of IEEE International Symposium on Circuits and Systems (ISCAS '09), May 2009.

"A High Throughput In-Loop De-blocking Filter Supporting H.264/AVC BP/MP/HP Video Coding", Cheng-An Chien, Hsiu-Cheng Chang, Jiun-In Guo, May 2009, Symp.ISCAS, p. 312-p. 315.

"A Two-Result-per-Cycle Deblocking Filter Architecture for QFHD H.264/AVC Decoder", Yuan-Chun Lin and Youn Long Lin, IEEE Transactions on Very Large Scale Integration (VLSI) Systems, vol. 17, No. 6, Jun. 2009, p. 838-p. 843.

"An In/Post-Loop Deblocking Filter With Hybrid Filtering Schedule", Tsu-Ming Liu, Student Member, IEEE, Wen-Ping Lee, and Chen-Yi Lee, Member, IEEE, IEEE Transactions on Circuits and Systems for Video Technology, vol. 17, No. 7, Jul. 2007, p. 937-p. 943.

"A Memory and Performance Optimized Architecture of Deblocking Filter in H.264/AVC", Kyeong-Yuk Min, Jong-Wha Chong, 2007 International Conference on Multimedia and Ubiquitos Engineering(MUE'07), Apr. 2007.

"A Near Optimal Deblocking Filter for H.264 Advanced Video Coding", Shen-Yu Shih, Cheng-Ru Chang, Youn-Long Lin, Jan. 2006, Conf. ASPDAC, p. 170-p. 175.

Japan Patent Office, Office Action, Patent Application Serial No. JP2010-086302, Jun. 5, 2012, Japan.

Japan Patent Office, Notice of Allowance, Patent Application Serial No. JP2010-086302, Jan. 8, 2013, Japan.

\* cited by examiner

FIG. 15C luma component 1510

| 0' | 1' | 2' | 3' |
|---|---|---|---|
| 4 | 5 | 6 | 7 |
| 8 | 9 | 10 | 11 |
| 12 | 13 | 14 | 15 | chroma component 1532

| 16' | 17' | 18' | 19' |
|---|---|---|---|
| 20 | 21 | 22 | 23 |
| 24 | 25 | 26 | 27 |
| 28 | 29 | 30 | 31 | chroma component 1534

| 32' | 33' | 34' | 35' |
|---|---|---|---|
| 36 | 37 | 38 | 39 |
| 40 | 41 | 42 | 43 |
| 44 | 45 | 46 | 47 |

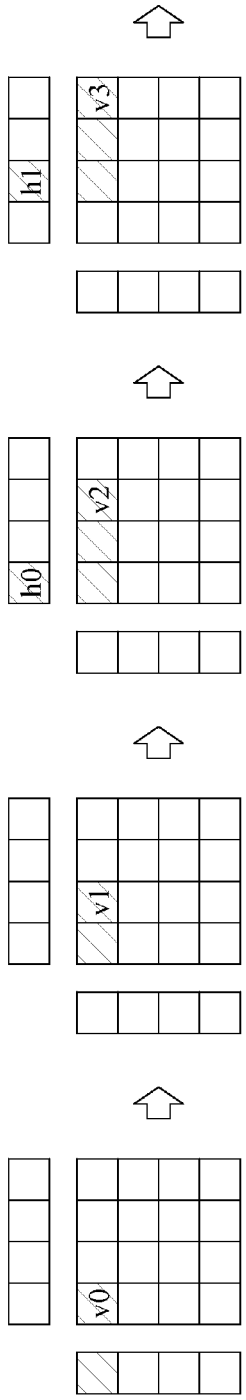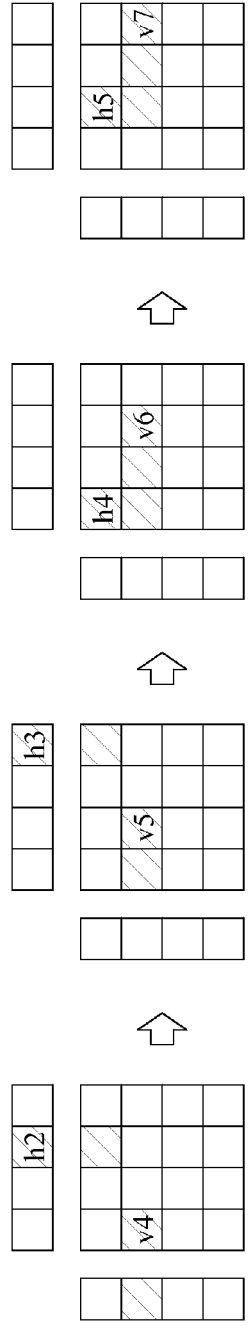

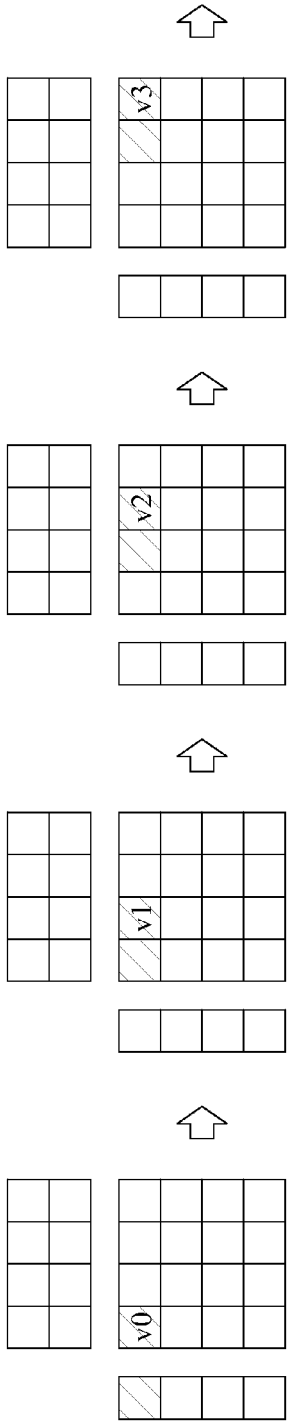
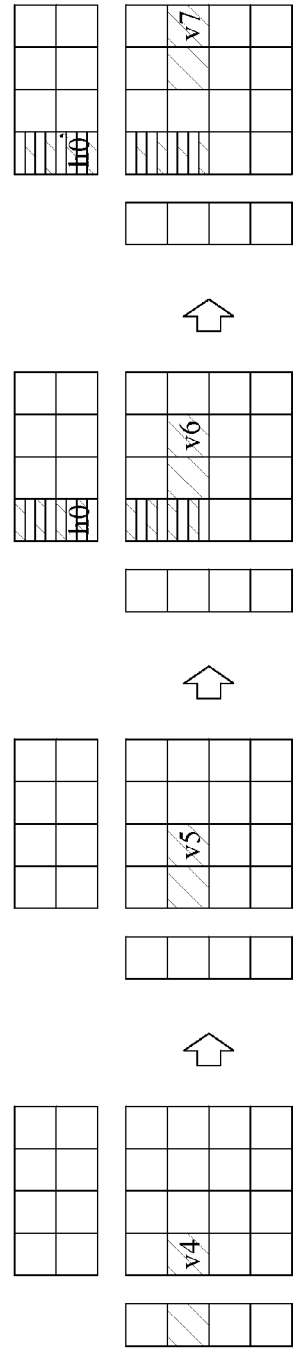
FIG. 18A FIG. 18B FIG. 18C FIG. 18D
FIG. 18E FIG. 18F FIG. 18G FIG. 18H
deblocking filtering independently and simultaneously on horizontal edges and vertical edges on MB of MBAFF format.

DEBLOCKING FILTERING APPARATUS AND METHOD FOR VIDEO COMPRESSION USING A DOUBLE FILTER WITH APPLICATION TO MACROBLOCK ADAPTIVE FRAME FIELD CODING

The present application is based on, and claims priority from U.S. Patent Application No. 61/256,000 filed on Oct. 29, 2009 and Taiwan Patent Application No. 099105715, filed Feb. 26, 2010, the disclosure of which is hereby incorporated by reference herein in its entirety.

TECHNICAL FIELD

The disclosure generally relates to a deblocking filtering apparatus and method for video compression.

BACKGROUND

Block-based video compression causes inconsistent visual quality on the block boundaries. The contemporary video compression technology utilizes a post-processing device, such as, deblocking filter, to reduce the blocking effect and improve the compression efficiency. As shown in the exemplary embodiment of FIG. 1A, the deblocking filter not included inside the coding/decoding loop of the video codec is called out-loop filter 110. On the other hand, H.264/advanced video coding (AVC) technology uses a deblocking filter inside the coding/decoding loop, called in-loop filters 122, 124, respectively, as shown in FIG. 1B, to remove the blocking effect and improve the compression efficiency.

As shown in the video sequence of FIG. 2A, H.264/AVC video compression standard allows a compressed video sequence 200 to be an arbitrary combination of interlaced frame-picture 210 and field-picture 220. As shown in the exemplar in FIG. 2B, a frame-picture 230 may be composed of a top-field 232 and a bottom-field 234. Top-field 232 is composed of even pixel rows and bottom-field 234 is composed of odd pixel-rows. The format of interlaced video sequence 200 is called as the picture adaptive frame field (PICAFF) format.

As shown in the macroblock format exemplar of FIG. 3, a frame-picture 300 may be partitioned to a plurality of macroblocks (MBs) 302, with each MB being composed of a 16×16 pixels luma component 310 and two chroma components, such as, chroma components 312, 314. 16×16 pixels luma component 310 is composed of 16 4×4 blocks. The chroma components of H.264/AVC have three types of formats, 4:2:0, 4:2:2 and 4;4:4, respectively. As shown in the exemplar of FIG. 3, a chroma component of a 4:2:0 format is composed of 8×8 pixels, such as, chroma components 312, 314. A chroma component of a 4:2:2 format is composed of 16×8 pixels, such as, chroma components 322, 324. A chroma component of a 4:4:4 format is composed of 16×16 pixels, such as, chroma components 332, 334.

As shown in FIG. 4, an MB pair in a frame-picture 400 may be a frame-MB pair 410 or a field-MB pair 420, where the MB pair has the same horizontal position and adjacent vertical positions in the frame. Top-field MB 422 of field-MB pair 420 is composed of even-numbered pixel rows in the field-MB pair 420 and bottom-field MB 424 is composed of odd-numbered pixel rows in the field-MB pair 420. H.264/AVC compression standard allows a frame-picture 400 to be an arbitrary combination of frame-MB pair 410 and field-MB pair 420. This type of format is called as the macroblock adaptive frame field (MBAFF) format.

For an MB with 4:2:0 chroma component, deblocking filter needs to process 48 block edges, including 24 vertical edges and 24 horizontal edges. For an MB with 4:2:2 chroma component, deblocking filter needs to process 64 block edges, and for an MB with 4:4:4 chorma component, deblocking filter needs to process 96 block edges. As shown in FIG. 5, when the deblocking filter processes deblocking for H.264/AVC compression, vertical edge 510 is processed before horizontal edge 520. Furthermore, the filtered pixels of the vertical edges deblocked by the deblocking effect are used as the input data for filtering horizontal edge 520, where v is the pixels of the vertical edge, on the left of edge 510 is the filtered pixels of the left neighboring block and on the right of edge 510 is the filtered pixels of the current block; and h is the pixels of the horizontal edge, above edge 520 is the filtered pixels of the top neighboring block and underneath edge 520 is the filtered pixels of the current block. In other words, the filtered pixels deblocked by a vertical filter are used as input to a horizontal filter for deblocking.

As shown in FIG. 6, for a vertical edge 510 or a horizontal edge 520, four lines of total 32 pixels related to a block edge will be processed line by line. Each line is composed of 8 pixels across the block-edge, named as p3, p2, p1, p0, q0, q1, q,2 q3, where p0 and q0 are the two adjacent pixels located in each side of the block edge. The 8 pixels and related parameters, such as, boundary strength, are used as input data for deblocking filters. The 8 pixels after deblocked by a deblocking filter are named as p'3, p'2, p'1, p'0, q'0, q'1, q'2, q'3. The deblocking filter that processes a line of pixels at a time is called line filter.

Accordingly, for a full HD video sequence with a frame rate of 30 frames per second, if the chroma components use 4:2:0 format, the deblocking filter needs to processes up to 11,705,280 block edges. If the deblocking filter is realized by the software implementation on the processor, the working clock of the processor will exceed 500 MHz. When the video sequence is compressed with MBAFF format, as shown in FIG. 7, if the top neighboring macroblock of the current frame-MB 705 is a field-MB, the deblocking filter must process the boundaries of the two top MBs (top-field MB 710 and bottom-field MB 720) additionally. For the video sequence, up to 12,194,880 edges must be processed per second. Furthermore, when performing vertical processing, the memory for reading and writing access is up to 32×195840×2 bytes, and when performing horizontal processing, the memory for reading and writing access is up to 32×(195840+16320)×2 bytes. In other words, the memory bandwidth requirement for the deblocking filter is up to 780,472,320 bytes per second.

U.S. Patent Publication No. 2008/0043853 disclosed a deblocking filter. As shown in FIG. 8, deblocking filter 801 uses a processing unit 802 to concurrently perform column-direction-edge filtering on a plurality of groups of pixels which are displayed in rows of cross-edge 812 on a current MB 804. For example, in a first clock cycle, pixels E4-E7 and pixels G4-G7 are processed, and in the second clock cycle, pixels F4-F7 and pixels H4-H7 are processed. Also, a rearrangement unit 803 is used to rearrange the processed pixels into respective rows. For example, pixels E4-E7 in row E are rearranged into pixels E4, F4, G4, H4 in column 4, pixels F4-F7 of row F are rearranged into pixels E5, F5, G5, H5 in column 5, pixels G4-G7 of row G are rearranged into pixels E6, F6, G6, H6 in column 6, and pixels H4-H7 of row H are rearranged into pixels E7, F7, G7, H7 in column 7. In this manner, the processing time of waiting for reading necessary pixels for deblocking horizontal edges may be reduced.

Cheng-An Chien, et. al, disclosed an in-loop deblocking filter with high throughput in 2008 and 2009. As shown in FIG. 9, deblocking filter 910 uses a 4×4/8×8 line filter 912 and a buffer management scheme for supporting various video coding tools of H.264/AVC, such as, PICAFF format and MBAFF format. The buffer management scheme uses two types of internal buffers to store data of reference MB pair, and the internal pixels are not required to be written into external memory 920 when deblocking filter switching between horizontal and vertical edge processing and rearranging the internal pixels for processing.

SUMMARY

The disclosed exemplary embodiments may provide a deblocking filtering apparatus and method for video compression, for filtering the boundary blocking effect inside a macroblock (MB) and between macroblocks (MBs) of a video sequence. The data in each vertical or horizontal edge of every two adjacent blocks is composed of pixel data of a previous segment and pixel data of a posterior segment.

In an exemplary embodiment, the disclosed relates to a deblocking filtering apparatus for video compression. The apparatus comprises an adaptive queue, a first and a second swap buffers, a first filter and a second filter. The first filter inputs pixel data of a first previous segment previously stored in the first swap buffer, and the non-filtered pixel data of a current MB as pixel data of a first posterior segment, then performs a vertical deblocking filtering, outputs a previous-segment filtered pixel data to the adaptive queue and outputs a posterior-segment filtered pixel data for restoring in the first swap buffer. The second filter inputs pixel data of a second previous segment previously stored in the second swap buffer, uses the output data of the adaptive queue as a second posterior-segment pixel data, then performs a horizontal deblocking filtering, and stores a full-segment filtered pixel data already outputted back to the second swap buffer.

In another exemplary embodiment, the disclosed relates to a deblocking filtering method for video compression, comprising: inputting a first previous segment pixel data pre-stored in a first swap buffer, and inputting non-filtered pixel data of a current MB as a first posterior-segment pixel data; performing a vertical deblocking filtering, outputting a previous-segment filtered pixel data to an adaptive queue and outputting a posterior-segment filtered pixel data for storing in the first swap buffer; inputting a second previous-segment pixel data stored in a second swap buffer, and using the output data of the adaptive queue as a second posterior-segment pixel data; and after performing a horizontal deblocking filtering, storing a full-segment filtered pixel data already outputted back to the second swap buffer.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIGS. 12A-12B show respective exemplary schematic views of the filtering order of the boundary pixel data when performing vertical and horizontal deblocking filtering on MB of 4:2:0 format, consistent with certain disclosed embodiments.

FIGS. 13A-13B show respective exemplary schematic views of the filtering order of the boundary pixel data when performing vertical and horizontal deblocking filtering on MB of 4:2:2 format, consistent with certain disclosed embodiments.

FIG. 15A shows an exemplary schematic view of the filtering order of the boundary pixel data when second filter performing horizontal deblocking filtering on MB of 4:2:0 format and MBAFF format, consistent with certain disclosed embodiments.

FIG. 15B shows an exemplary schematic view of the filtering order of the boundary pixel data when second filter performing horizontal deblocking filtering on MB of 4:2:2 format and MBAFF format, consistent with certain disclosed embodiments.

FIG. 15C shows an exemplary schematic view of the filtering order of the boundary pixel data when second filter performing horizontal deblocking filtering on MB of 4:4:4 format and MBAFF format, consistent with certain disclosed embodiments.

FIGS. 17A-17H show an exemplar of the filtering order of the edges when first filter and second filter performing horizontal deblocking filtering on MB of 4:2:0 format, consistent with certain disclosed embodiments.

FIGS. 18A-18H show an exemplar of the filtering order of the edges when first filter and second filter performing horizontal deblocking filtering on MB of 4:2:0 format and MBAFF format, consistent with certain disclosed embodiments.

DETAILED DESCRIPTION OF THE EXEMPLARY EMBODIMENTS

The exemplary embodiments disclose a deblocking filtering apparatus and method for video compression, by buffering the partial data required by a first and a second filters with a first and a second swap buffers, and implementing the buffering function with registers to increase the flexibility of data exchange and to reduce the number of memory accesses, enhance the efficiency and throughput of deblocking filters as well as reduce the internal buffer size. The first and the second filters perform the vertical and horizontal deblocking filtering inside a macroblock (MB) and between neighboring macroblocks (MBs) of a video sequence, respectively.

Figure 1A:
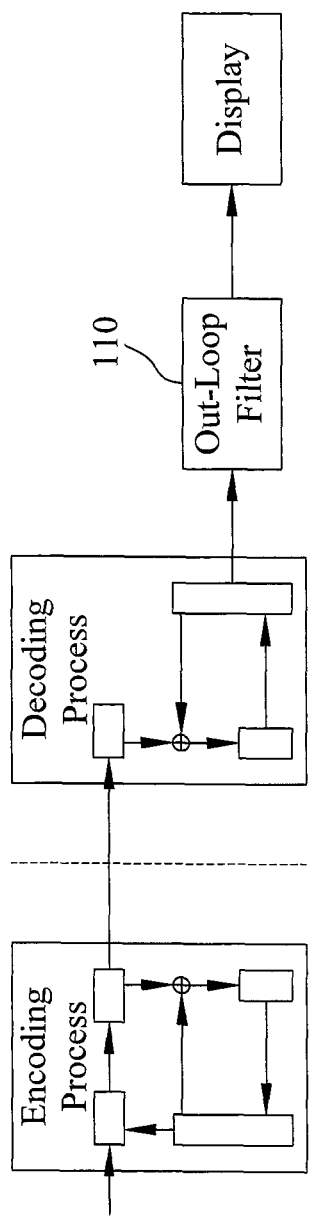
FIG. 1A shows an exemplary schematic view of a conventional out-loop deblocking filtering apparatus.
Figure 1B:
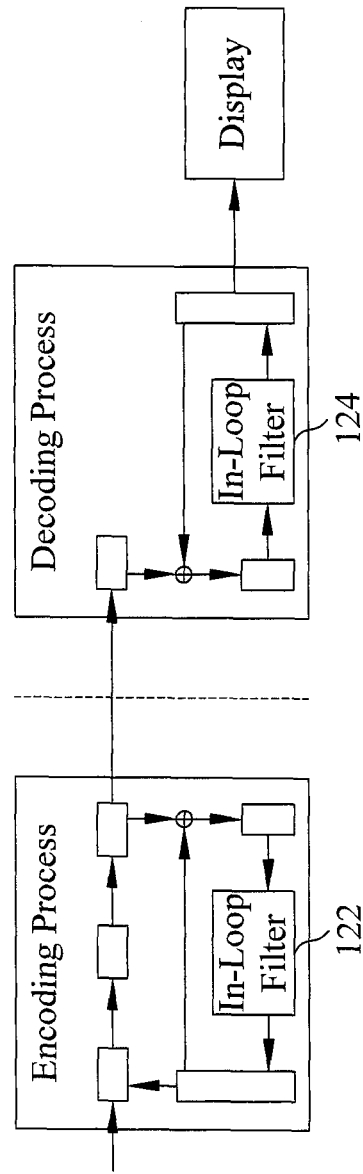
FIG. 1B shows an exemplary schematic view of a conventional in-loop deblocking filtering apparatus.
Figures 2A, 2B:
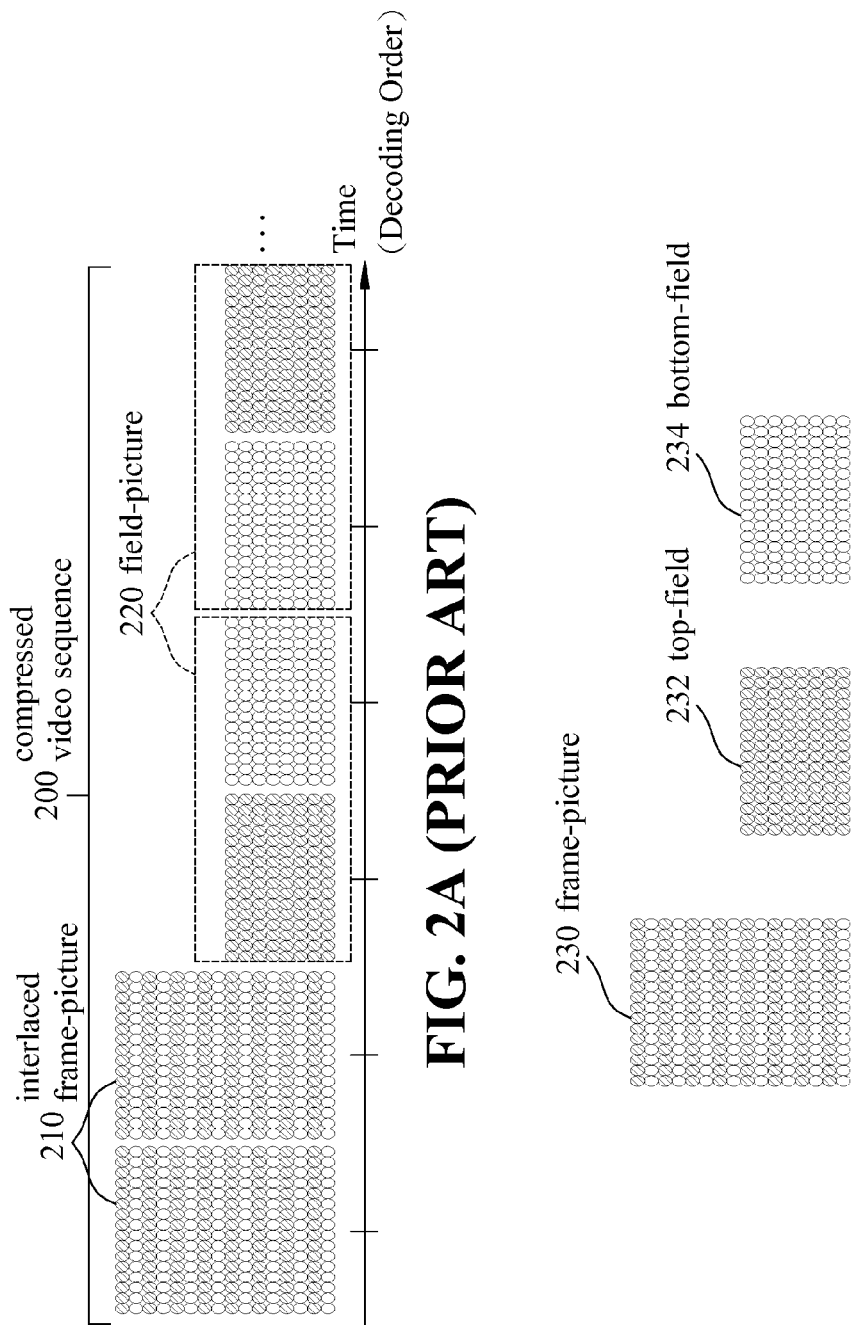
FIG. 2A shows an exemplary schematic view of a compressed video sequence made of interlaced frame-picture and field-picture.
FIG. 2B shows an exemplary schematic view of frame picture, top-field picture and bottom-field picture.
Figure 3:
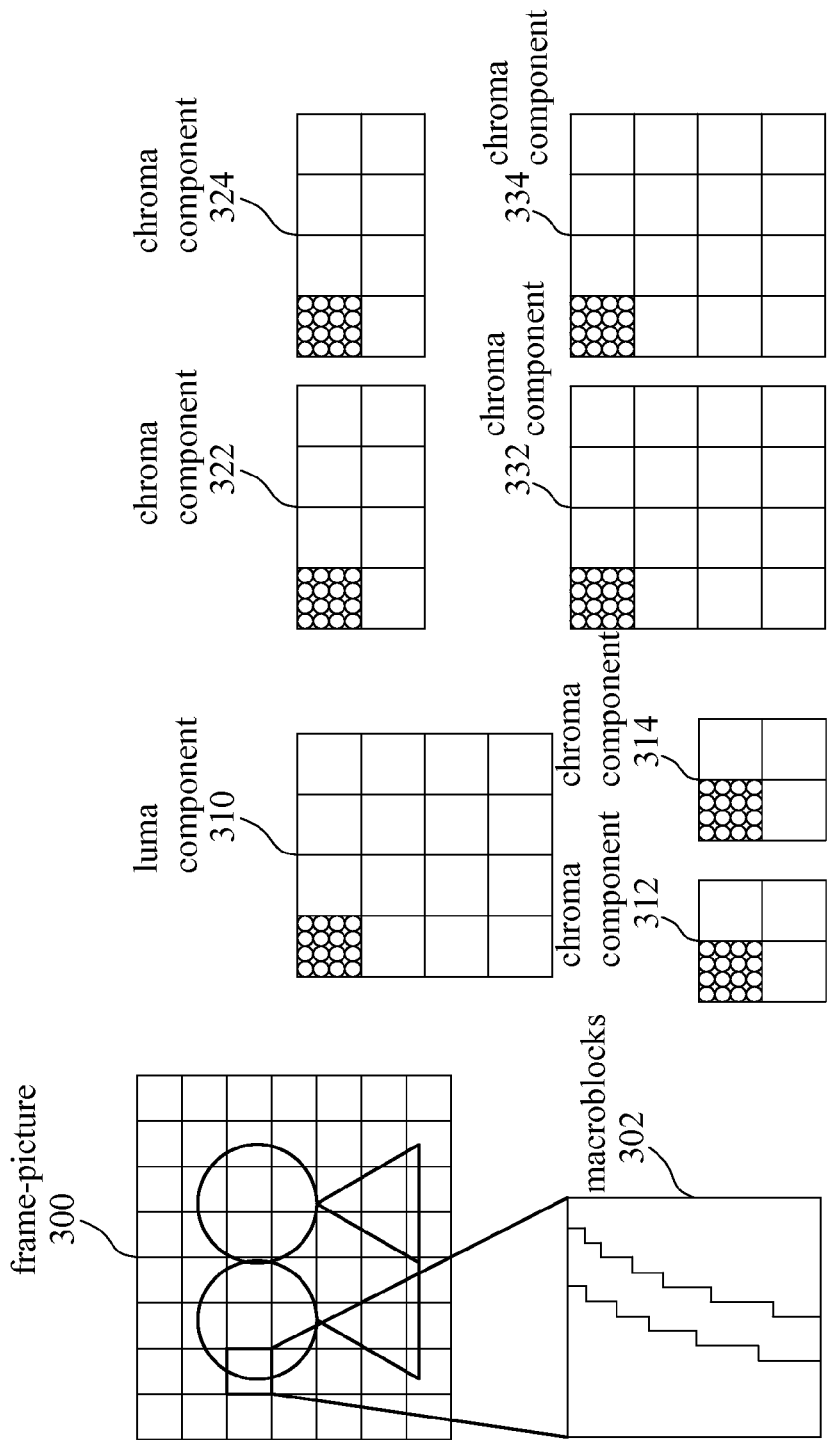
FIG. 3 shows an exemplary schematic view of macroblock (MB) format.
Figure 4:
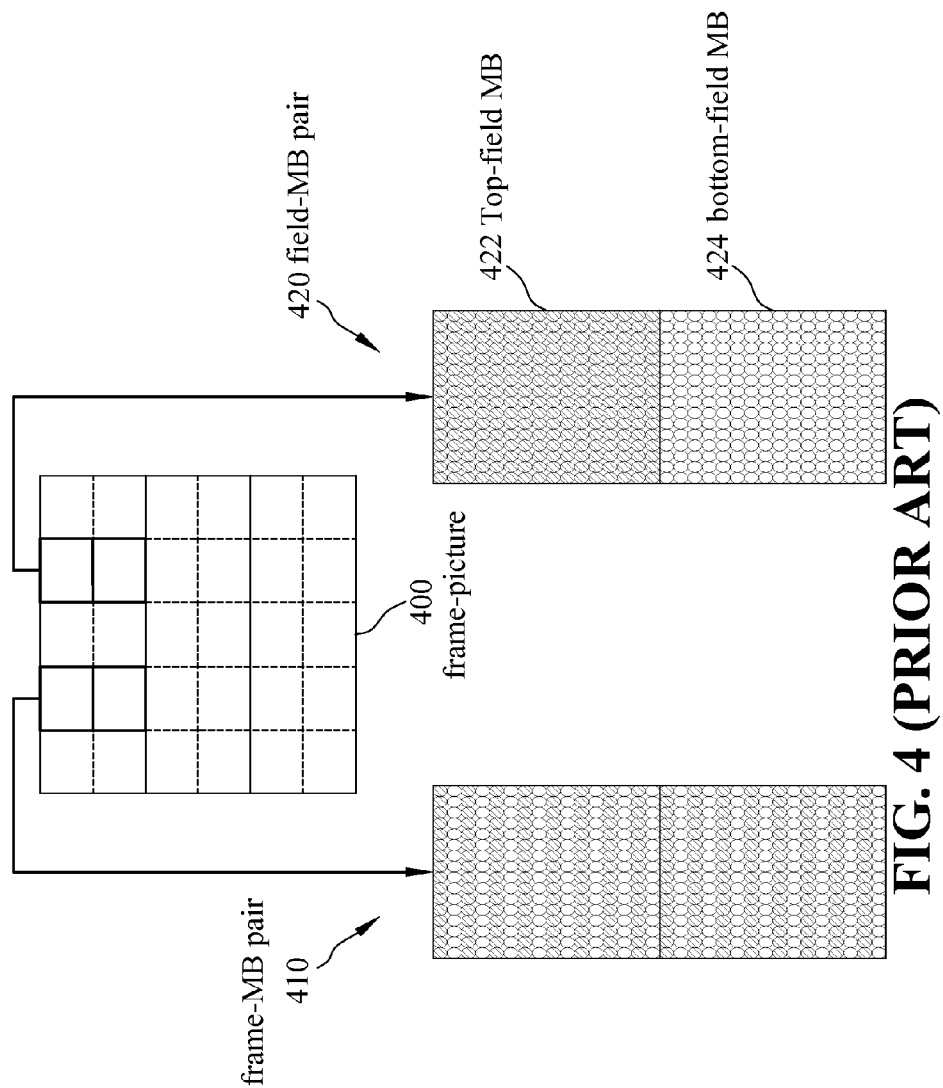
FIG. 4 shows an exemplary schematic view of adaptive frame field format of MB.
Figure 5:
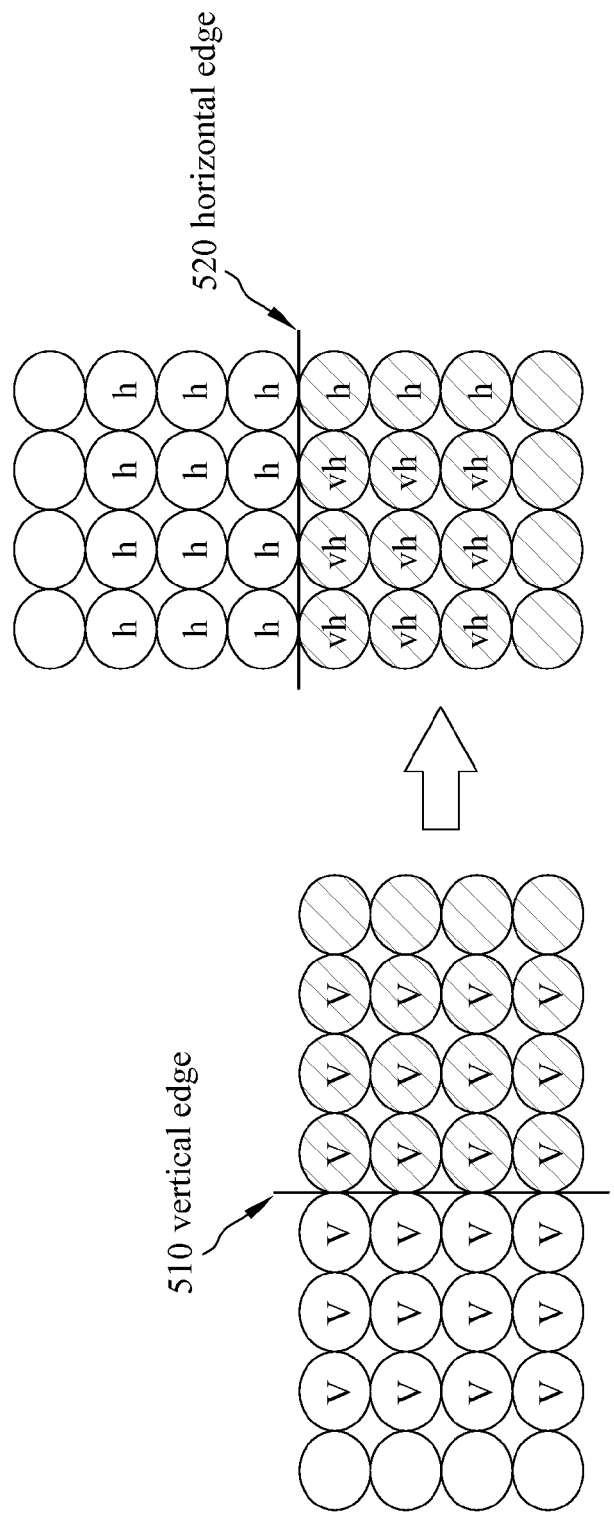
FIG. 5 shows an exemplary schematic view that illustrating the filtered pixels from a vertical deblocking filter are further filtered by a horizontal deblocking filter.
Figure 6:
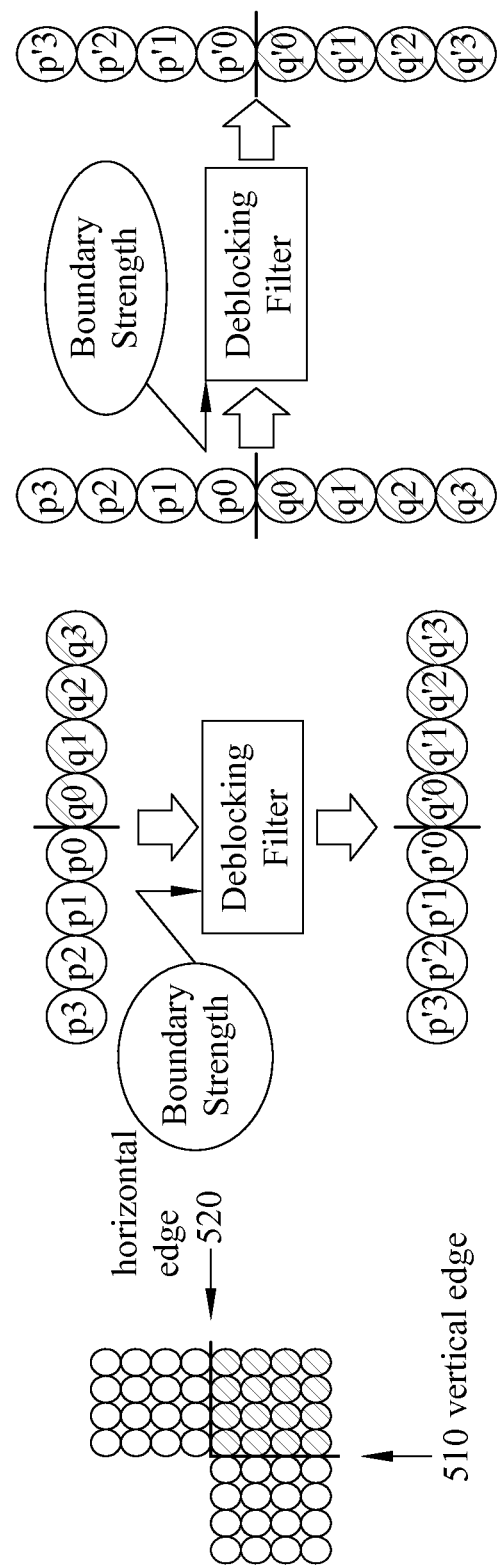
FIG. 6 shows an exemplary schematic view of the input and output data for a line filter.
Figure 7:
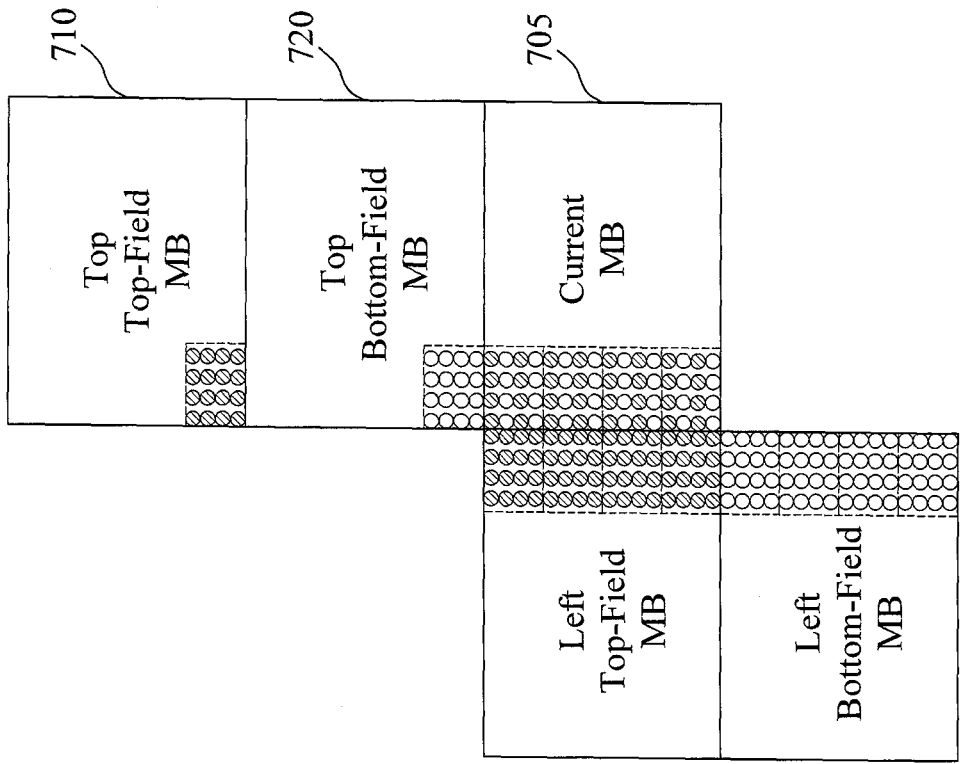
FIG. 7 shows an exemplary schematic view illustrating the edges between top neighboring bottom-field-MBs and the edge between top neighboring top-field-MBs need to do the deblocking filtering when the current processing MB is MBAFF format.
Figure 8:
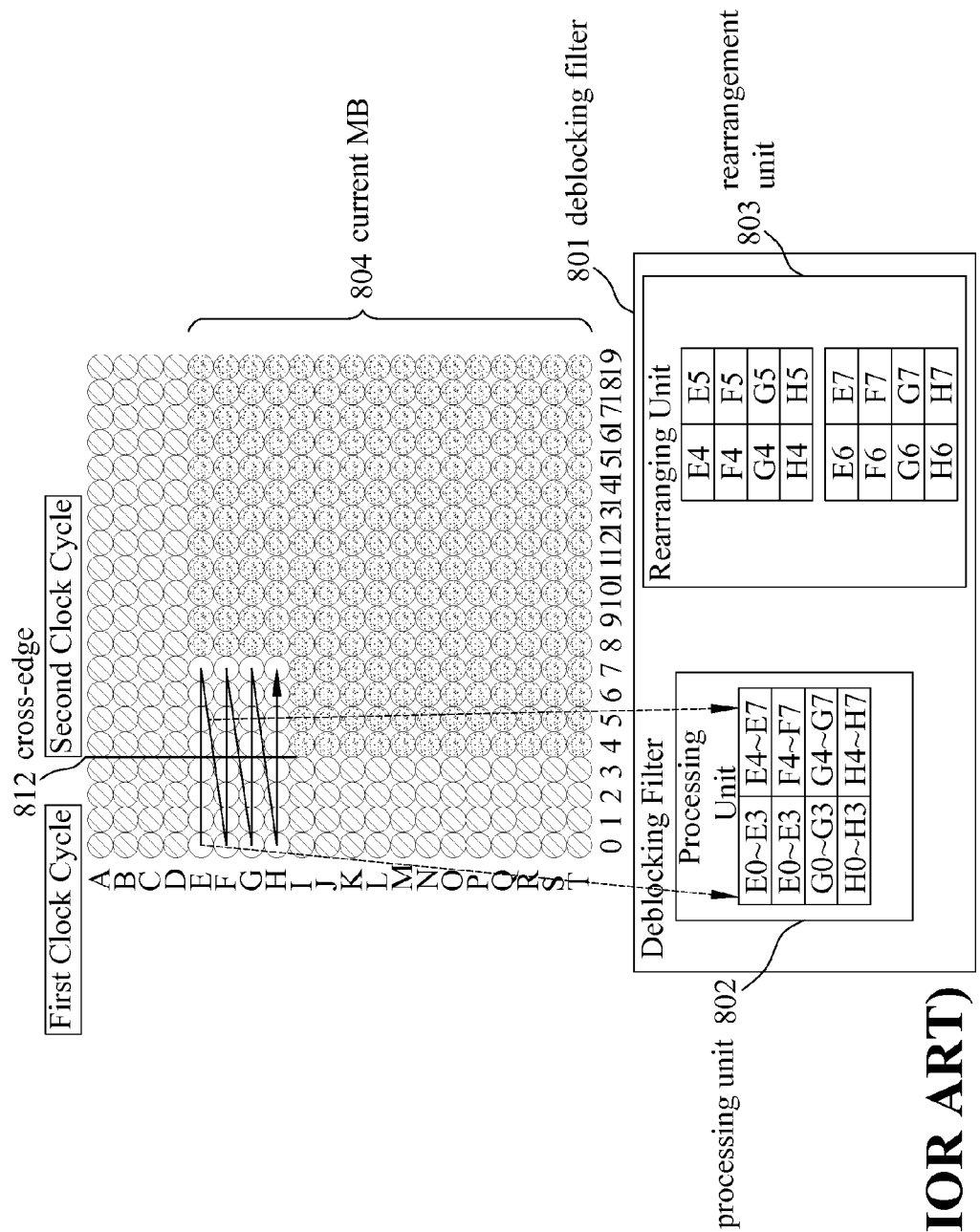
FIG. 8 shows an exemplary schematic view of a deblocking filter.
Figure 9:
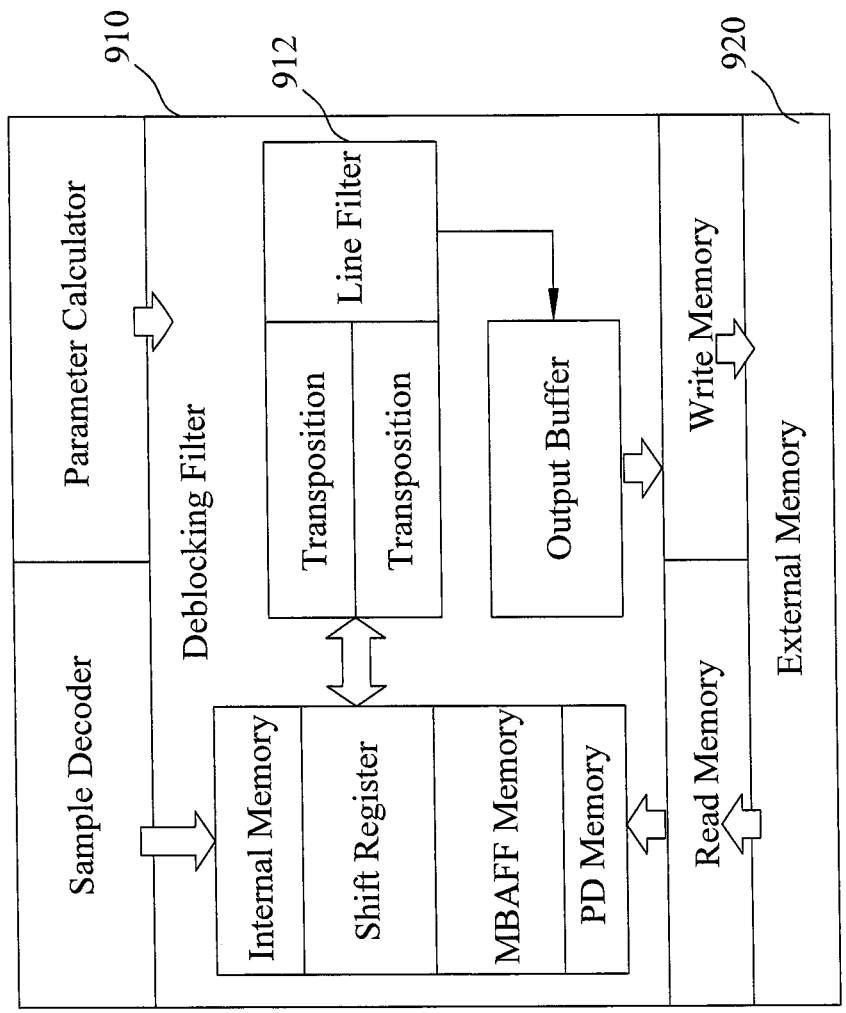
FIG. 9 shows an exemplary schematic view of an in-loop deblocking filter with high throughput.
Figure 10:
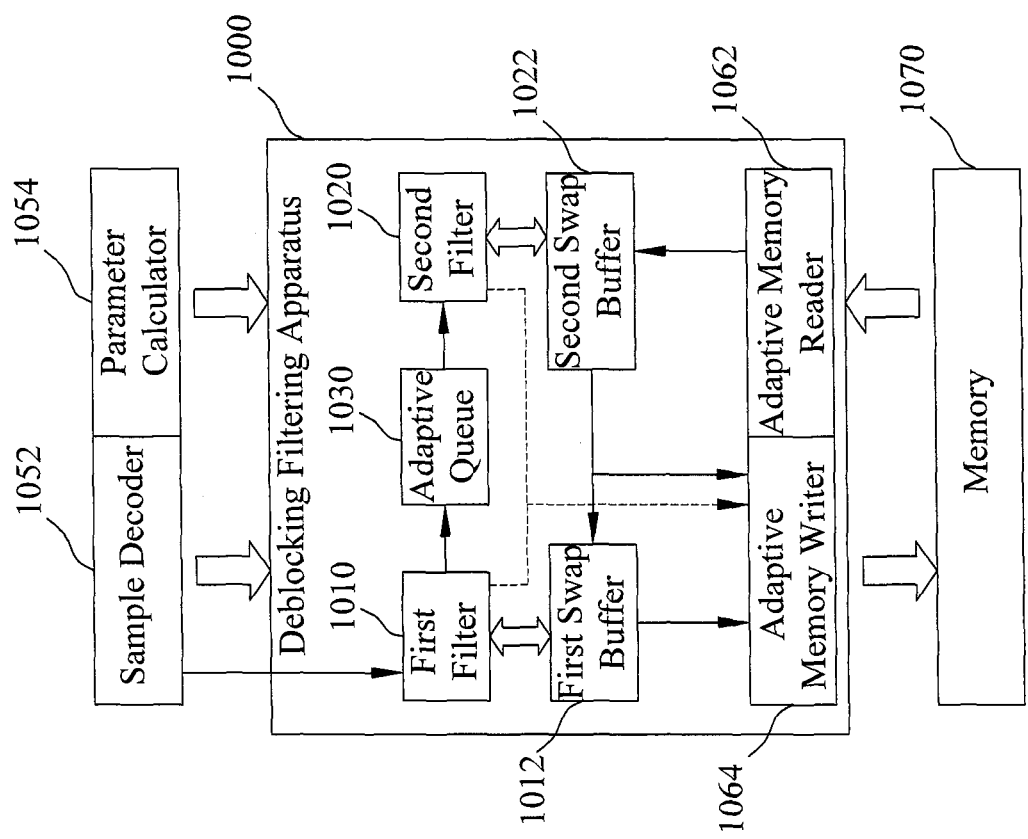
FIG. 10 shows an exemplary schematic view of a deblocking filtering apparatus, consistent with certain disclosed embodiments.

FIG. 10 shows an exemplary schematic view of a deblocking filtering apparatus, consistent with certain disclosed embodiments. In FIG. 10, deblocking apparatus 1000 is to filter the blocking effect on the boundaries inside a MB and between MBs in a video sequence. Each boundary data in the vertical or horizontal direction between two neighboring blocks is divided into two parts, with a part called a previous-segment pixel data, denoted as {p3, p2, p1, p0} and the other part called a posterior-segment pixel data, denoted as {q0, q1, q2, q3}. Deblocking filtering apparatus 1000 may comprise an adaptive queue 1030, a first swap buffer 1012, a second swap buffer 1022, a first filter 1010 and a second filter 1020.

First filter 1010 and second filter 1020 perform a vertical deblocking filtering and a horizontal deblocking filtering on the boundary data between blocks in a video sequence, respectively. After first filter 1010 performs the vertical deblocking filtering, the output data is written to adaptive queue 1030. Once adaptive queue 1030 has any data, second filter 1020 read the data from adaptive queue 1030 and uses them as a portion of input data to perform the horizontal deblocking filtering.

The non-filtered pixel data of the current processing MB may be from a sample decoder 1052, and is used as a posterior-segment pixel data {q0, q1, q2, q3} inputted to first filter 1010. The previous-segment pixel data {p3, p2, p1, p0} inputted to first filter 1010 is from the data previously stored in first swap buffer 1012. After first filter 1010 performs a vertical deblocking filtering, first filter 1010 outputs a posterior-segment filtered pixel data {q'0, q'1, q'2, q'3} and stores back to first swap buffer 1012, and outputs a previous-segment filtered pixel data {p'3, p'2, p'1, p'0}, which is stored by adaptive queue 1030.

The previous-segment pixel data {p3, p2, p1, p0} inputted to second filter 1020 is from data previously stored in second swap buffer 1022, and the posterior-segment pixel data {q0, q1, q2, q3} inputted to second filter 1020 is from the output data of adaptive queue 1030. After second filter 1020 performs a horizontal deblocking filtering, a full-segment filtered pixel data {p'3, p'2, p'1, p'0, q'0, q'1, q'2, q'3} are restored to second swap buffer 1022 by second filter 1020.

When the current processing MB is using MBAFF format, a portion of the output filtered pixel data {p'3, p'2, p'1, p'0, q'0, q'1, q'2, q'3} of second filter 1020 may be stored back to first swap buffer 1012 via second buffer 1022. Deblocking filtering apparatus 1000 may generate related parameters, such as boundary strength or flag, via a parameter calculator 1054 and provides to first filter 1010 and second filter 1020 as the input parameters for deblocking filtering.

Deblocking filtering apparatus 1000 may further includes an adaptive memory reader 1062 and an adaptive memory writer 1064. The initial data of second swap buffer 1022 may be provided by adaptive memory reader 1062 and adaptive memory reader 1062 may read data from a memory 1070. During the deblocking filtering process, the data stored in first swap buffer 1012 and second swap buffer 1022 may be written to a memory 1070 via adaptive memory writer 1064. Memory 1070 is not restricted to be located inside or outside of deblocking filtering apparatus 1000.

For example, when the horizontal deblocking filtering is to be performed on the boundary between the current processing MB and the top neighboring MB, the initial data of second swap buffer 1022 may be provided by adaptive memory reader 1062, and adaptive memory reader 1062 reads the initial data from memory 1070. The number of accessing initial data from memory 1070 is related to the related parameters and flags generated by parameter calculator 1054. For example, when the boundary strength is 4, the entire 4×4 block is read from memory 1070. When the boundary strength is 1, 2, or 3, a 4×3 block is read from memory 1070. For the specific situation of MB of MBAFF format, a 4×3 block is read from memory 1070. If the horizontal edge belongs to the chroma component, a 4×2 block is read from memory 1070. When the boundary strength is 0 or a global flag is set as 1 (or true), no data is read from memory 1070.

After deblocking filtering apparatus performs vertical and horizontal deblocking filtering, the filtered pixel data stored in first swap buffer 1012 and second swap buffer 1022 will be stored back to memory 1070. The total number of times for writing data to memory 1070 is related to flags generated by first filter 1010 and second filter 1020. Because after first filter 1010 and second filter 1020 perform respective vertical and horizontal deblocking filtering, respective flags will be generated to indicate whether the filtered pixel data is different from the non-filtered pixel data. If different, the respective flag is set as 1 (true); otherwise, the flag is set as 0 (or false).

Figures 11A, 11B:
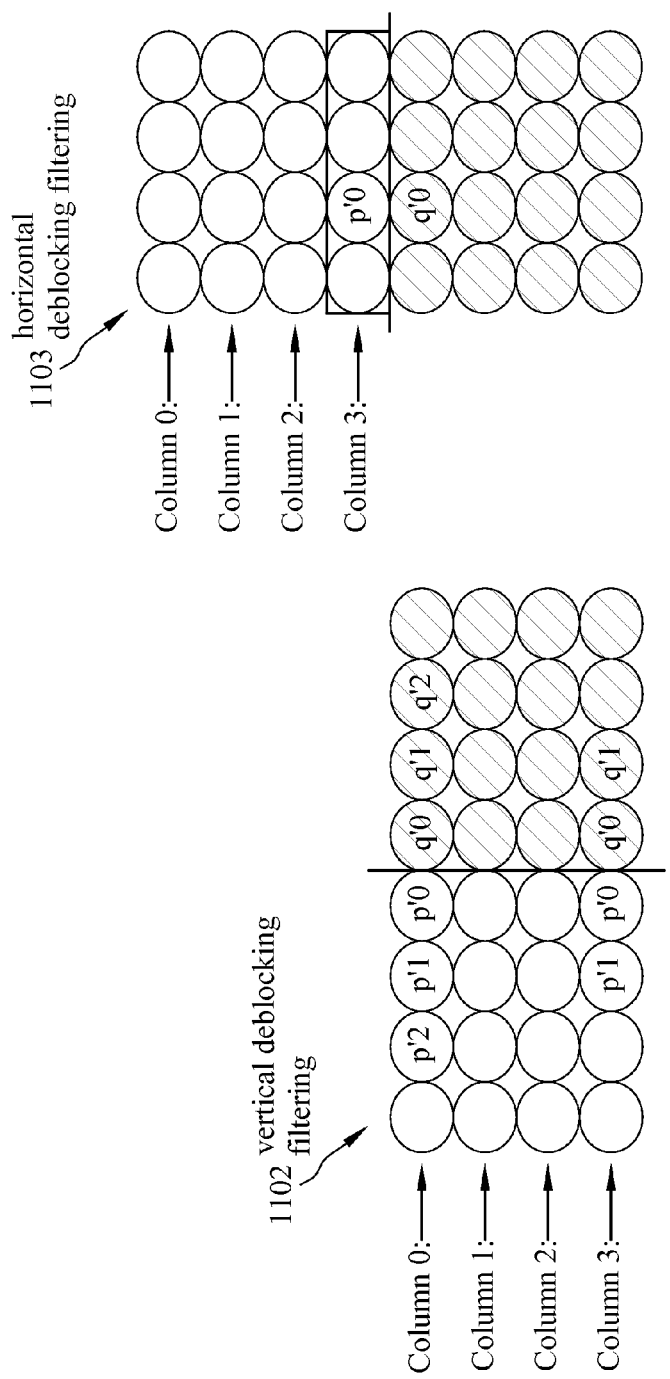
FIGS. 11A-11B show exemplary schematic views of setting corresponding flags of filtered pixel data when deblocking filtering apparatus writing pixel data of MB to memory, consistent with certain disclosed embodiments.

For example, as shown in FIG. 11A, after first filter 1010 performs vertical deblocking filtering, first filter 1010 modifies partial pixel data of column 0 and column 3 of block 1102, and sets the respective flag of filtered pixel data, such as, flag=1, to differentiate from the unmodified pixel data, for example, flag=0, wherein pixel data marked as p'2, p'1, p'0, q'0, q'1, q'2 in column 0 and pixel data marked as p'1, p'0, q'0, q'1 in column 3 are all modified filtered pixel data; while the pixel data in column 1 and column 2 are not written to memory because the corresponding flag indicates the filtered value is the same as the value prior to the filtering, and thus the number of times of writing data is reduced. Similarly, as shown in FIG. 11B, after second filter 1020 performs horizontal deblocking filtering on block 1103, second filter 1020 only writes the pixel data of column 3 to memory because the corresponding flag generated by second filter 1020 indicates that only the pixel data of column 3 has been modified by second filter 1020.

Figures 12A, 12B:
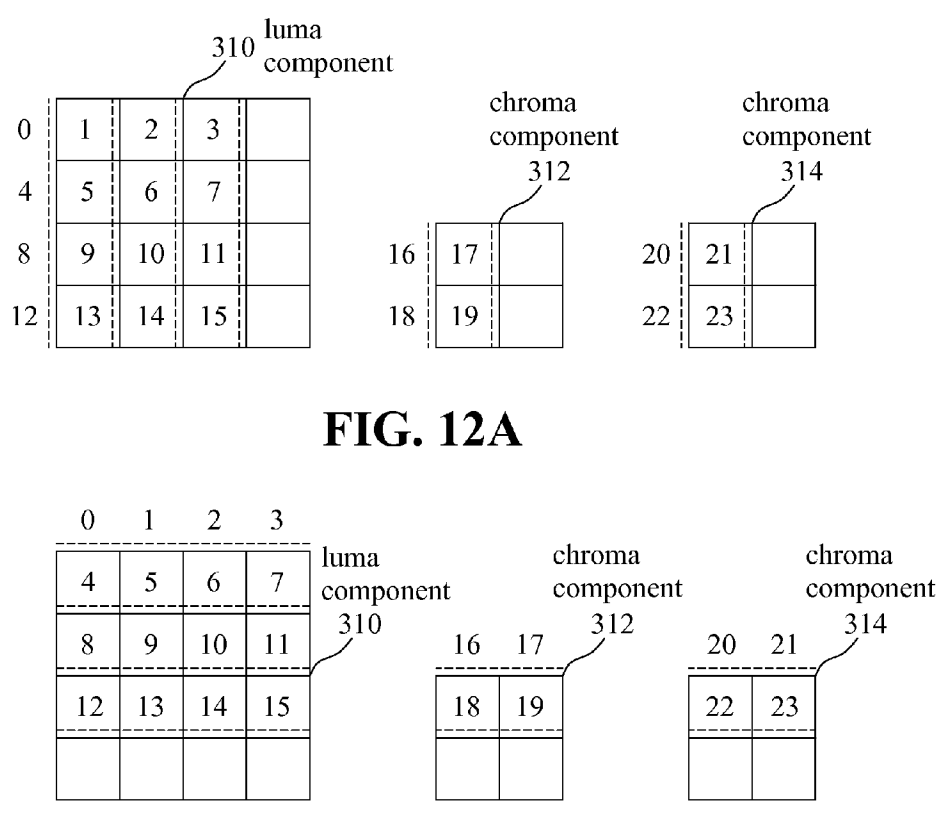

The following uses the three formats of the chroma components of H.264/AVC, i.e., 4:2:0, 4:2:2 and 4:4:4 formats, as exemplars to describe the filtering order of the vertical and horizontal boundary pixels between MBs during the deblocking filtering process. The exemplars in FIG. 12A and FIG. 12B describe respectively the filtering order of the boundary pixel data when performing vertical and horizontal deblocking filtering on MB of 4:2:0 format, consistent with certain disclosed embodiments. In the exemplar of FIG. 12A, the vertical deblocking filtering is performed on the vertical boundary pixel data in the order of vertical edge 0 to vertical edge 23, shown as the numbers on the dash line of FIG. 12A. Wherein vertical edge 0 to vertical edge 15 are the vertical edges of 16×16 pixel luma component 310 and vertical edges 16-19 and vertical edges 20-23 are the vertical edges of 8×8 pixel chroma components 312, 314, respectively. In the exemplar of FIG. 12B, the horizontal deblocking filtering is performed on the horizontal boundary pixel data in the order of horizontal edge 0 to horizontal edge 23, shown as the numbers on the dash line of FIG. 12B. Wherein horizontal edge 0 to horizontal edge 15 are the horizontal edges of 16×16 pixel luma component 310 and horizontal edges 16-19 and horizontal edges 20-23 are the horizontal edges of 8×8 pixel chroma components 312, 314, respectively.

Figures 13A, 13B:
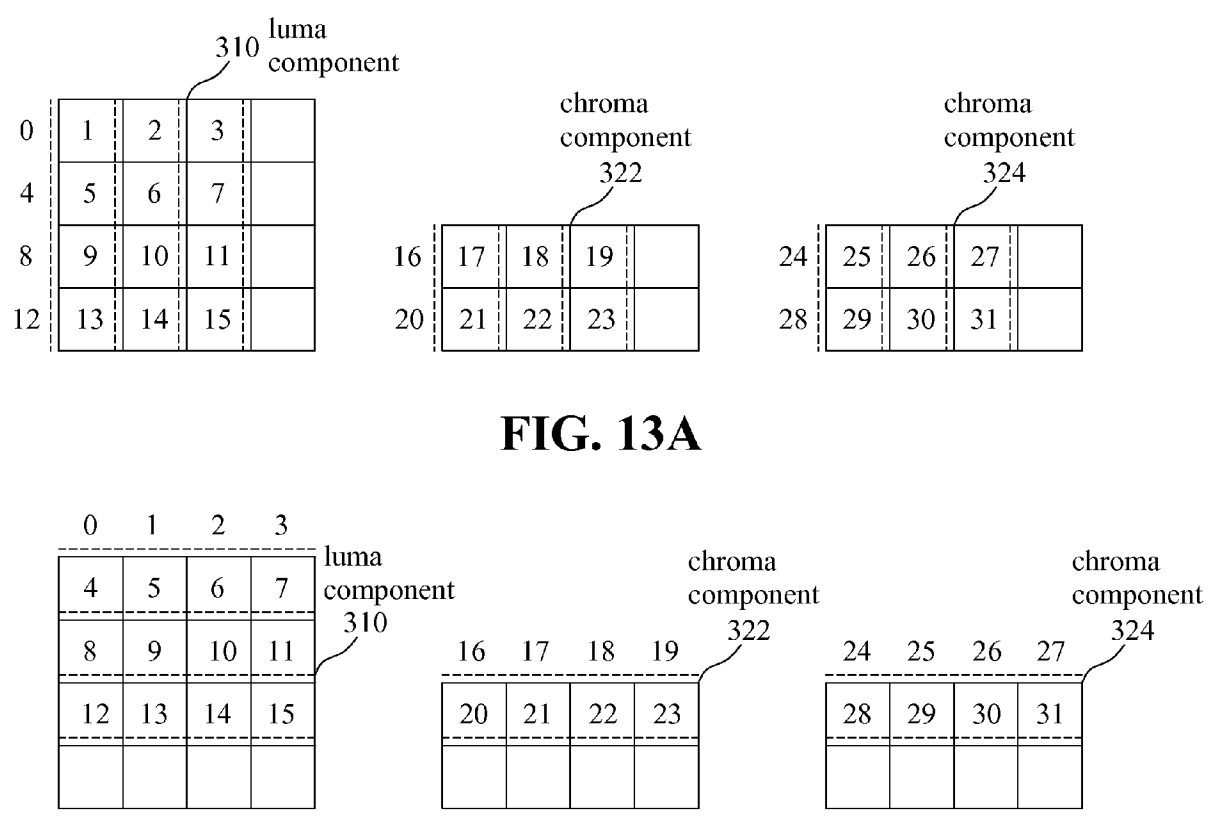

The exemplars in FIG. 13A and FIG. 13B describe respectively the filtering order of the boundary pixel data when performing vertical and horizontal deblocking filtering on MB of 4:2:2 format, consistent with certain disclosed embodiments. In the exemplar of FIG. 13A, the vertical deblocking filtering is performed on the vertical boundary pixel data in the order of vertical edge 0 to vertical edge 31, shown as the numbers on the dash line of FIG. 13A. Wherein vertical edge 0 to vertical edge 15 are the vertical edge of 16×16 pixel luma component 310 and vertical edges 16-23 and vertical edges 24-31 are the vertical edges of 16×8 pixel chroma components 322, 324, respectively. In the exemplar of FIG. 13B, the horizontal deblocking filtering is performed on the horizontal boundary pixel data in the order of horizontal edge 0 to horizontal edge 31, shown as the numbers on the dash line of FIG. 13B. Wherein horizontal edge 0 to horizontal edge 15 are the horizontal edge of 16×16 pixel luma component 310 and horizontal edges 16-23 and horizontal edges 24-31 are the horizontal edges of 16×8 pixel chroma components 322, 324, respectively.

Figure 14A:
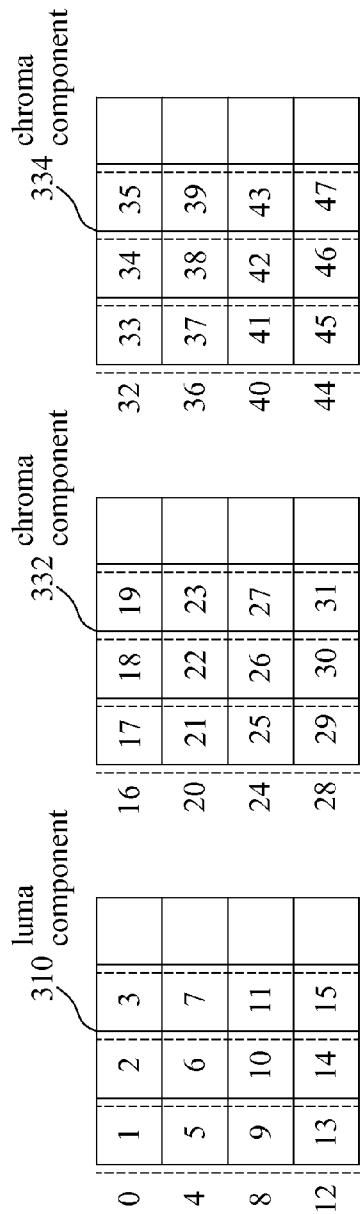
FIGS. 14A-14B show respective exemplary schematic views of the filtering order of the boundary pixel data when performing vertical and horizontal deblocking filtering on MB of 4:4:4 format, consistent with certain disclosed embodiments.
Figure 14B:
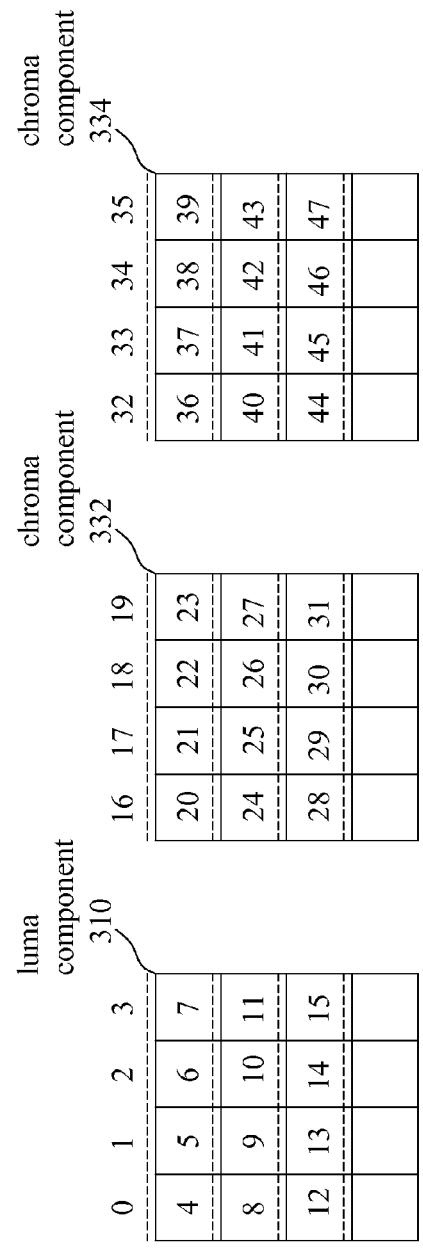

The exemplars in FIG. 14A and FIG. 14B describe respectively the filtering order of the boundary pixel data when performing vertical and horizontal deblocking filtering on MB of 4:4:4 format, consistent with certain disclosed embodiments. In the exemplar of FIG. 14A, the vertical deblocking filtering is performed on the vertical boundary pixel data in the order of vertical edge 0 to vertical edge 47, shown as the numbers on the dash line of FIG. 14A. wherein vertical edge 0 to vertical edge 15 are the vertical edge of 16×16 pixel luma component 310 and vertical edges 16-31 and vertical edges 32-47 are the vertical edges of 16×16 pixel chroma components 332, 334, respectively. In the exemplar of FIG. 14B, the horizontal deblocking filtering is performed on the horizontal boundary pixel data in the order of horizontal edge 0 to horizontal edge 47, shown as the numbers on the dash line of FIG. 14B. wherein horizontal edge 0 to horizontal edge 15 are the horizontal edge of 16×16 pixel luma component 310 and horizontal edges 16-31 and horizontal edges 32-47 are the horizontal edges of 16×16 pixel chroma components 332, 334, respectively.

Figures 15A, 15B:
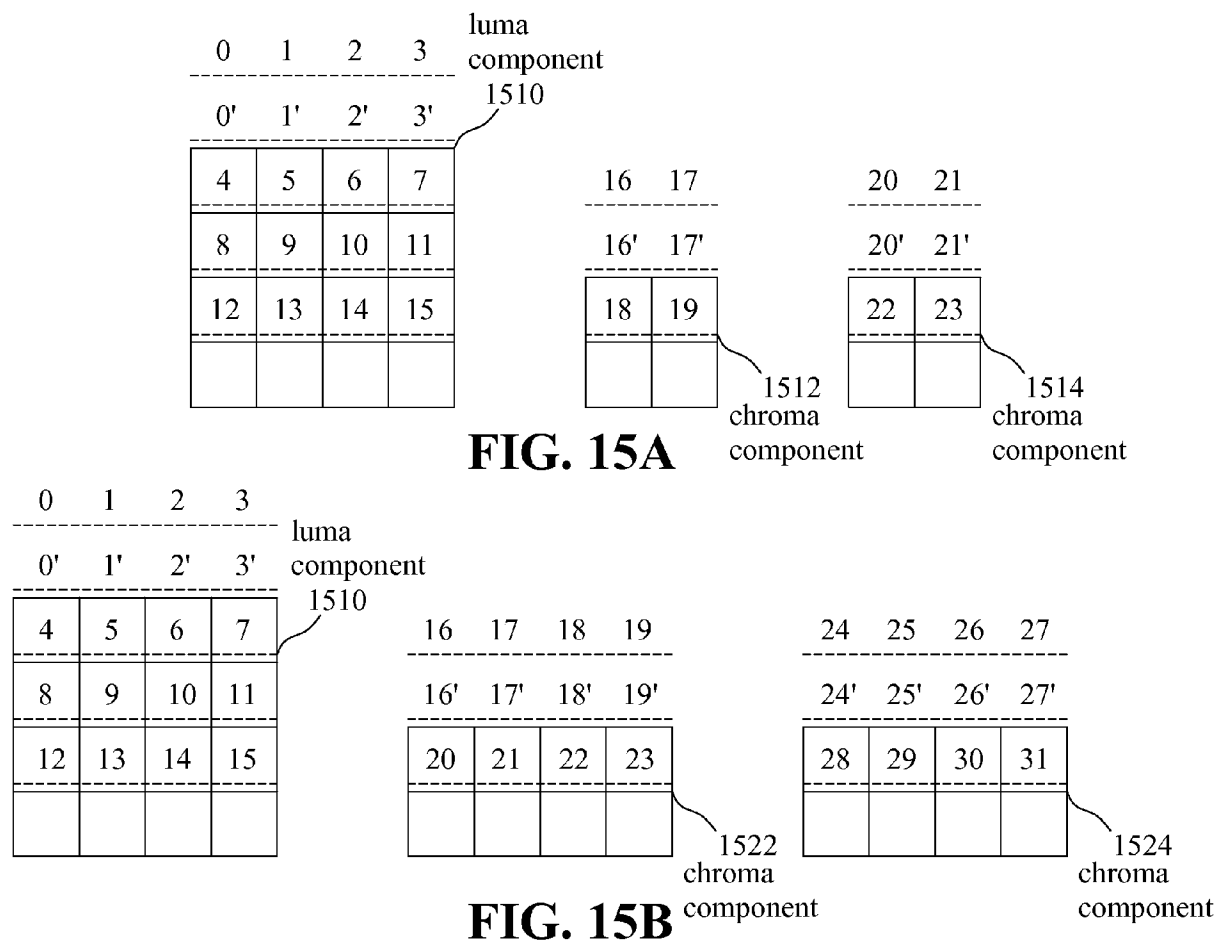

When the MB under the deblocking filtering process is using MBAFF format, FIG. 15A shows the filtering order of the pixel data on the boundary when second filter 1020 performing horizontal deblocking filtering on MB of 4:2:0 format and MBAFF format, consistent with certain disclosed embodiments. In the exemplar of FIG. 15A, the pixel data of horizontal edges are processed in the following filtering order of horizontal edges for performing horizontal deblocking filtering, i.e., 0–>0'–>1–>1'–>2–>2'–>3–>3', followed by 4-15, then 16→16'–>17–>17'–>18–>19–>20–>20'–>21–>21'–>22–>23, wherein horizontal edges 0-3 are the horizontal edges of 16×16 pixel luma component 1510 and the top neighboring top-field-MB boundary, horizontal edges 0'-3' are the horizontal edges of 16×16 pixel luma component 1510 and the boundary of the top neighboring bottom-field-MB, and horizontal edges 4-15 are the internal horizontal edges of luma component 1510; horizontal edges 16-17 are the horizontal edges of 8×8 pixel chroma components 1512 and the boundary of the top neighboring top-field-MB; horizontal edges 16'-17' are the horizontal edges of 8×8 pixel chroma components 1512 and the boundary of the top neighboring bottom-field-MB, and horizontal edges 18-19 are the internal horizontal edges of chroma component 1512; horizontal edges 20-21 are the horizontal edges of 8×8 pixel chroma components 1514 and the boundary of the top neighboring top-field-MB; edges 20'-21' are the horizontal edges of 8×8 pixel chroma components 1514 and the boundary of the top neighboring bottom-field-MB, and edges 22-23 are the internal horizontal edges of chroma component 1514.

FIG. 15B shows the filtering order of the pixel data on the boundary when second filter 1020 performing horizontal deblocking filtering on MB of 4:2:2 format and MBAFF format, consistent with certain disclosed embodiments. In the exemplar of FIG. 15B, the horizontal edge pixel data is processed in the following filtering order of horizontal edges for performing horizontal deblocking filtering, i.e., 0–>0'–>1→1'–>2–>2'–>3–>3', followed by 4-15, then 16–>16'–>17→17'–>18–>18'–>19–>19'–>20–>21–>22–>23, and then 24–>24'–>25–>25'–>26–>26'–>27–>27'–>28–>29–>30–>31, wherein horizontal edges 16-19 are the horizontal edges of 16×8 pixel chroma component 1522 and the boundary of the top neighboring top-field-MB, horizontal edges 16'-19' are the horizontal edges of 16×8 pixel chroma component 1522 and the boundary of the top neighboring bottom-field-MB, and horizontal edges 20-23 are the internal horizontal edges of chroma component 1522; horizontal edges 24-27 are the horizontal edges of 16×8 pixel chroma components 1524 and the boundary of the top neighboring top-field-MB, horizontal edges 24'-27' are the horizontal edges of 16×8 pixel chroma components 1524 and the boundary of the top neighboring bottom-field-MB, and horizontal edges 28-31 are the internal horizontal edges of chroma component 1524.

FIG. 15C shows the filtering order of the pixel data on the boundary when second filter 1020 performing horizontal deblocking filtering on MB of 4:4:4 format and MBAFF format, consistent with certain disclosed embodiments. In the exemplar of FIG. 15C, the horizontal edge pixel data is processed in the following order of horizontal edges for performing horizontal deblocking filtering, i.e., 0–>0'–>1–>1'–>2–>

2'->3->3', followed by 4-15, then 16->16'->17->17'->18→18'->19->19', and then 20-31, followed by 32->32'->33->33'->34->34'->35->35', and then 36-47, wherein horizontal edges 16-19 are the horizontal edges of 16×16 pixel chroma component 1532 and the top neighboring top-field-MB boundary, horizontal edges 16'-19' are the horizontal edges of 16×16 pixel chroma component 1532 and the top neighboring bottom-field-MB boundary, and horizontal edges 20-31 are the internal horizontal edges of chroma component 1532; horizontal edges 32-35 are the horizontal edges of 16×16 pixel chroma components 1534 and the top neighboring top-field-MB boundary, horizontal edges 32'-35' are the horizontal edges of 16×16 pixel chroma components 1534 and the top neighboring bottom-field-MB boundary, and horizontal edges 36-47 are the internal horizontal edges of chroma component 1534.

As aforementioned, after first filter 1010 performs vertical deblocking filtering, first filter 1010 writes partial output data to adaptive queue 1030. Once adaptive queue 1030 contains any data, second filter 1020 reads the data from adaptive queue 1030 and uses the data as a portion of input data to start the horizontal deblocking filtering.

Figure 16:
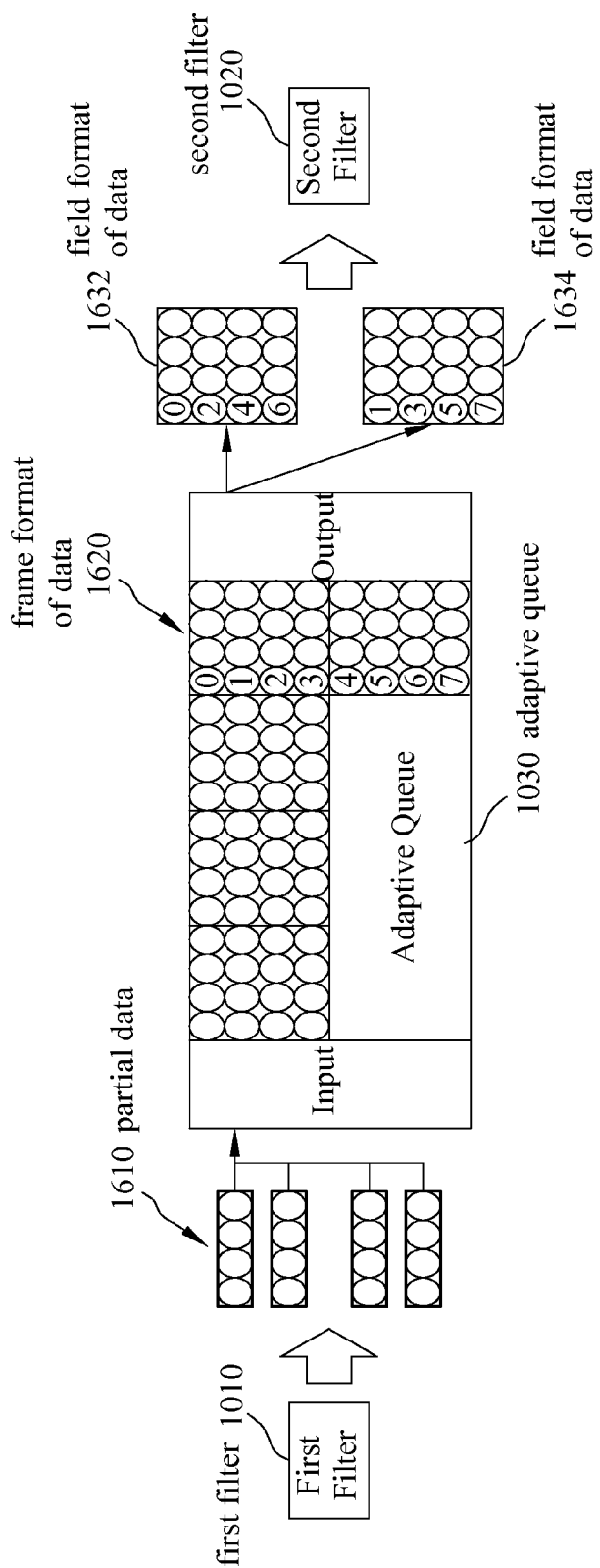
FIG. 16 shows an exemplary schematic view of the structure of adaptive queue, consistent with certain disclosed embodiments.

FIG. 16 shows an exemplary schematic view of the structure of adaptive queue 1030, consistent with certain disclosed embodiments. The data received by adaptive queue 1030 is partial data 1610 outputted by first filter 1010, and the data is queued in the internal buffer. The output data of adaptive queue 1030 is used as a portion of input data to second filter 1020. For the specific situation of MB using MBAFF format, adaptive queue 1030 will convert the data from frame format, such as, frame format of data 1620, to field format, such as, field format of data 1632 or field format of data 1634, required by second filter 1020, and then outputs to second filter 1020.

In other words, the exemplary embodiments may use adaptive queue 1030 to receive partial data outputted by first filter 1010, queue the data in at least an internal buffer, convert the data from the format used by MB into data of format required by second filter 1020, and output the data to second filter 1020. Then, the data outputted from adaptive queue 1030 is used as a portion of input data to second filter 1020.

Because the boundary data in the vertical direction and the horizontal direction may be independently and simultaneously deblocking filtered by first filter 1010 and second filter 1020, adaptive queue 1030 may buffer the data flow between the two filters. Furthermore, for MBs using MBAFF format, adaptive queue 1030 may reduce the latency problem introduced by transposition of MB or the conversion of frame block to/from field block.

FIG. 17A-FIG. 17H show the filtering order of the edges during first filter 1010 and second filter 1020 performing deblocking filtering on MB of 4:2:0 format, consistent with certain disclosed embodiments. As shown in FIGS. 17A-17H, first filter 1010 performs deblocking filtering on vertical edges 0-7 (denoted as v0-v7), respectively. After first filter 1010 processes vertical edge 1 (v1), partial output data is written to adaptive queue 1030, and second filter 1020 reads and uses the data as a portion of input data to start performing deblocking filtering on horizontal edges 0-5 (denoted as h0-h5). As shown in FIG. 17C, when second filter 1020 processes horizontal edge 0 (h0), first filter 1010 is also processing vertical edge 2 (v2). Also as shown in FIG. 17D, when second filter 1020 processes horizontal edge 1 (h1), first filter 1010 is also processing vertical edge 3 (v3). In other words, the exemplar of the disclosed embodiments allows first filter 1010 and second filter 1020 to perform deblocking filtering independently and simultaneously so as to improve the efficiency and throughput.

FIG. 18A-FIG. 18H show the filtering order of the edges when first filter 1010 and second filter 1020 performing deblocking filtering on MB of 4:2:0 format and MBAFF format, consistent with certain disclosed embodiments. As shown in FIGS. 18A-18H, first filter 1010 performs deblocking filtering on vertical edges 0-7 (denoted as v0-v7), respectively. After first filter 1010 processes vertical edge 5 (v5), partial output data is written to adaptive queue 1030, adaptive queue 1030 converts the frame-format data into the field-format data required by second filter 1020, and second filter 1020 reads and uses the field-format data as a portion of input data to start performing deblocking filtering on horizontal edges 0 and 0' (denoted as h0 and h0'). As shown in FIG. 18G, when second filter 1020 processes horizontal edge 0 (h0), first filter 1010 is also processing vertical edge 6 (v6). Also as shown in FIG. 18H, when second filter 1020 processes horizontal edge 0' (h0'), first filter 1010 is also processing vertical edge 7 (v7). In other words, the exemplar of the disclosed embodiments allows first filter 1010 and second filter 1020 to perform deblocking filtering independently and simultaneously on MB of MBAFF format so as to improve the efficiency and throughput.

During the deblocking filtering process, the prior art buffers the entire data of the MB, while the disclosed exemplary embodiments buffers partial data of the MB. The buffered partial data is the data required by first filter 1010 and second filter 1020, and registers may be used to achieve the benefits of buffering to improve the data exchange flexibility, and also more suitable for MBAFF format MB. Take the exemplar of FIG. 19 as example, for the MB using 4:2:0 format, 32 registers are used, denoted as V0-V7, VX0-VX7, H0-H7, and HX0-HX7. Register group VREG consists of registers V0-V7, register group VREG_EXT consists of registers VX0-VX7, register group HREG consists of registers H0-H7 and register group HREG_EXT consists of registers HX0-HX7

First swap buffer 1012 includes register group VREG and register group VREG_EXT, and is for storing data required by first filter 1010. Second swap buffer 1022 includes register group HREG and register group HREG_EXT, and is for storing data required by second filter 1020. The number of registers in the register group may vary for other exemplars. In other words, the exemplar of the disclosed embodiments uses buffers to store the partial data of MB required by first filter 1010 and second filter 1020, and uses a plurality of register groups to implement the buffering function to improve the data exchange flexibility. The exemplars in FIG. 19-FIG. 21 describe the register groups required by the deblocking filtering apparatus when processing MB of three different formats, consistent with certain disclosed embodiments. Wherein the numerical symbol on each block indicates the block number, for example, #5 indicates block 5.

Figure 19:
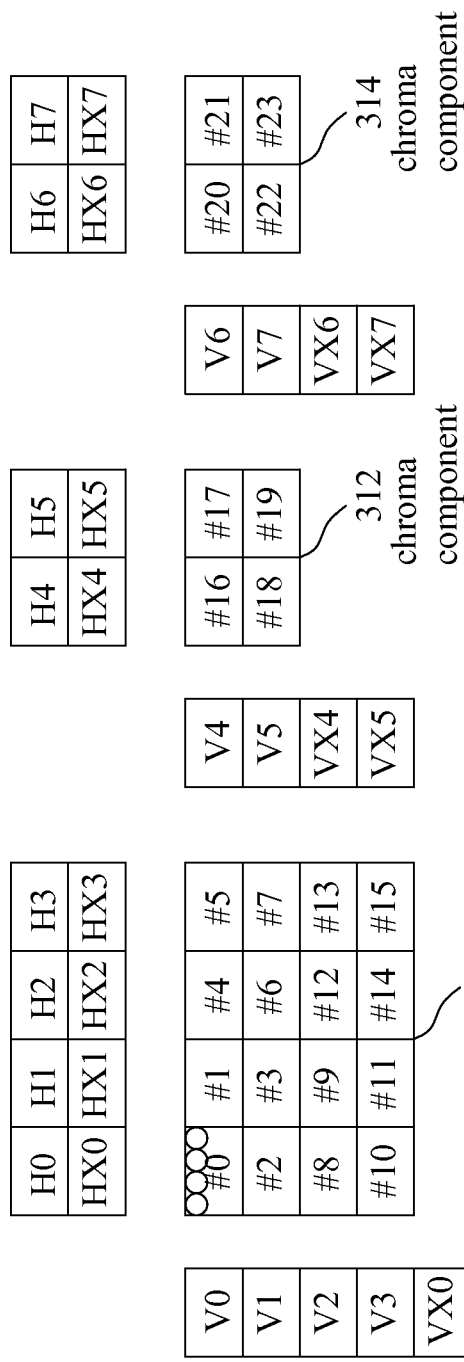
FIG. 19 shows an exemplary schematic view of an exemplar of register groups required by the deblocking filtering apparatus for processing MB of 4:2:0 format, consistent with certain disclosed embodiments.

For MB of 4:2:0 format, as shown in FIG. 19, registers V0-V3, VX0-VX3, H0-H3, HX0-HX3 are for storing the data of luma component 310. Each register size is 32-bit×4. Registers V4-V7, VX4-VX7, H4-H7, HX4-HX7 are for storing the data of chroma components 312, 314, where registers V4-V5, VX4-VX5, H4-H5, HX4-HX5 are for storing the data of chroma component 312, with each register size being 32-bit×2, and registers V6-V7, VX6-VX7, H6-H7, HX6-HX7 are for storing the data of chroma component 314, with each register size being 32-bit×2.

Figure 20:
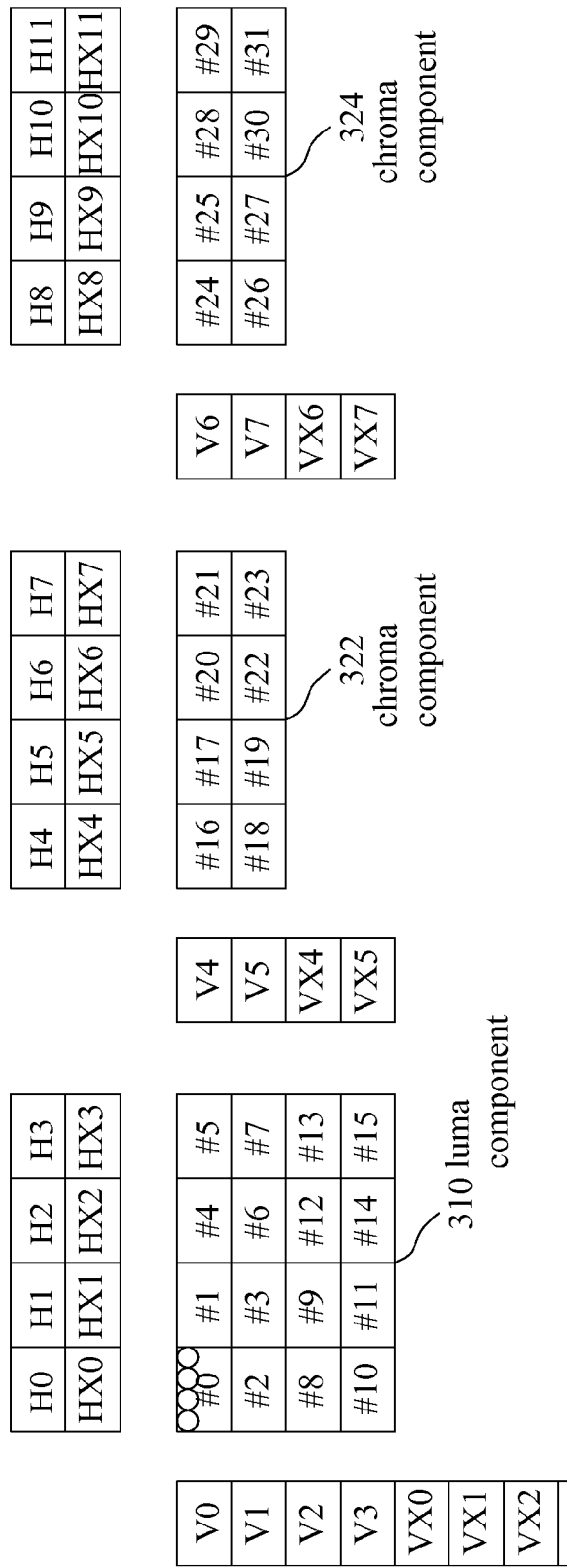
FIG. 20 shows an exemplary schematic view of an exemplar of register groups required by deblocking filtering apparatus for processing MB of 4:2:2 format, consistent with certain disclosed embodiments.

For MB of 4:2:2 format, as shown in FIG. 20, forty registers are used, denoted as registers V0-V7, VX0-VX7, H0-H11, HX0-HX11. The difference between MB of 4:2:2 format and of 4:2:0 format is that register group HREG consists of H0-H11 and register group HREG_EXT consists of HX0-HX11. Registers V4-V7, VX4-VX7, H4-H11, HX4-H11 are for storing the data of chroma components 322, 324, where registers V4-V5, VX4-VX5, H4-H7, HX4-HX7 are for storing the data of chroma component 322, with each register size being 32-bit×2, and registers V6-V7, VX6-VX7, H8-H11, HX8-HX11 are for storing the data of chroma component 324, with each register size being 32-bit×2.

Figure 21:
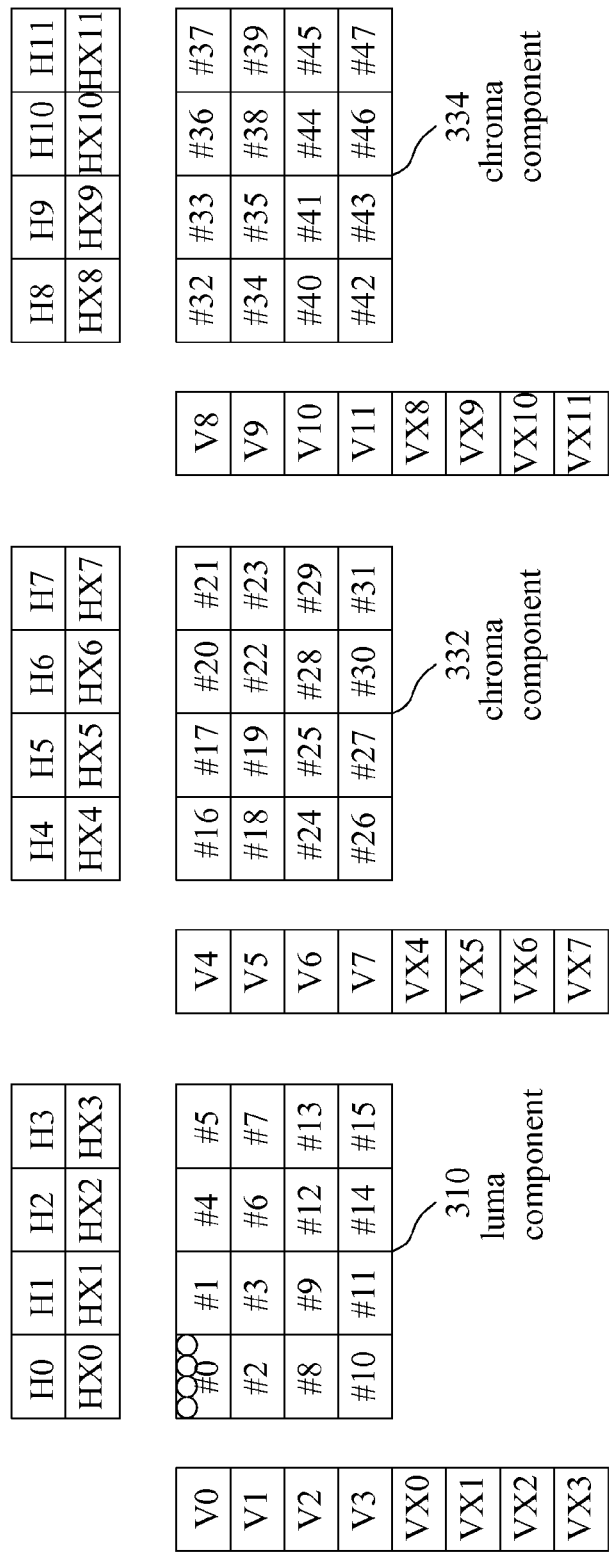
FIG. 21 shows an exemplary schematic view of an exemplar of register groups required by deblocking filtering apparatus for processing MB of 4:4:4 format, consistent with certain disclosed embodiments.

For MB of 4:4:4 format, as shown in FIG. 21, forty eight registers are used, denoted as registers V0-V11, VX0-VX11, H0-H11, HX0-HX11. The difference between MB of 4:4:4 format and of 4:2:2 format is that register group VREG consists of V0-V11 and register group VREG_EXT consists of VX0-VX11. Registers V4-V11, VX4-VX11, H4-H11, HX4-H11 are for storing the data of chroma components 332, 334, where registers V4-V7, VX4-VX7, H4-H7, HX4-HX7 are for storing the data of chroma component 332, with each register size being 32-bit×2, and registers V8-V11, VX8-VX11, H8-H11, HX8-HX11 are for storing the data of chroma component 334, with each register size being 32-bit×2.

Figure 22:
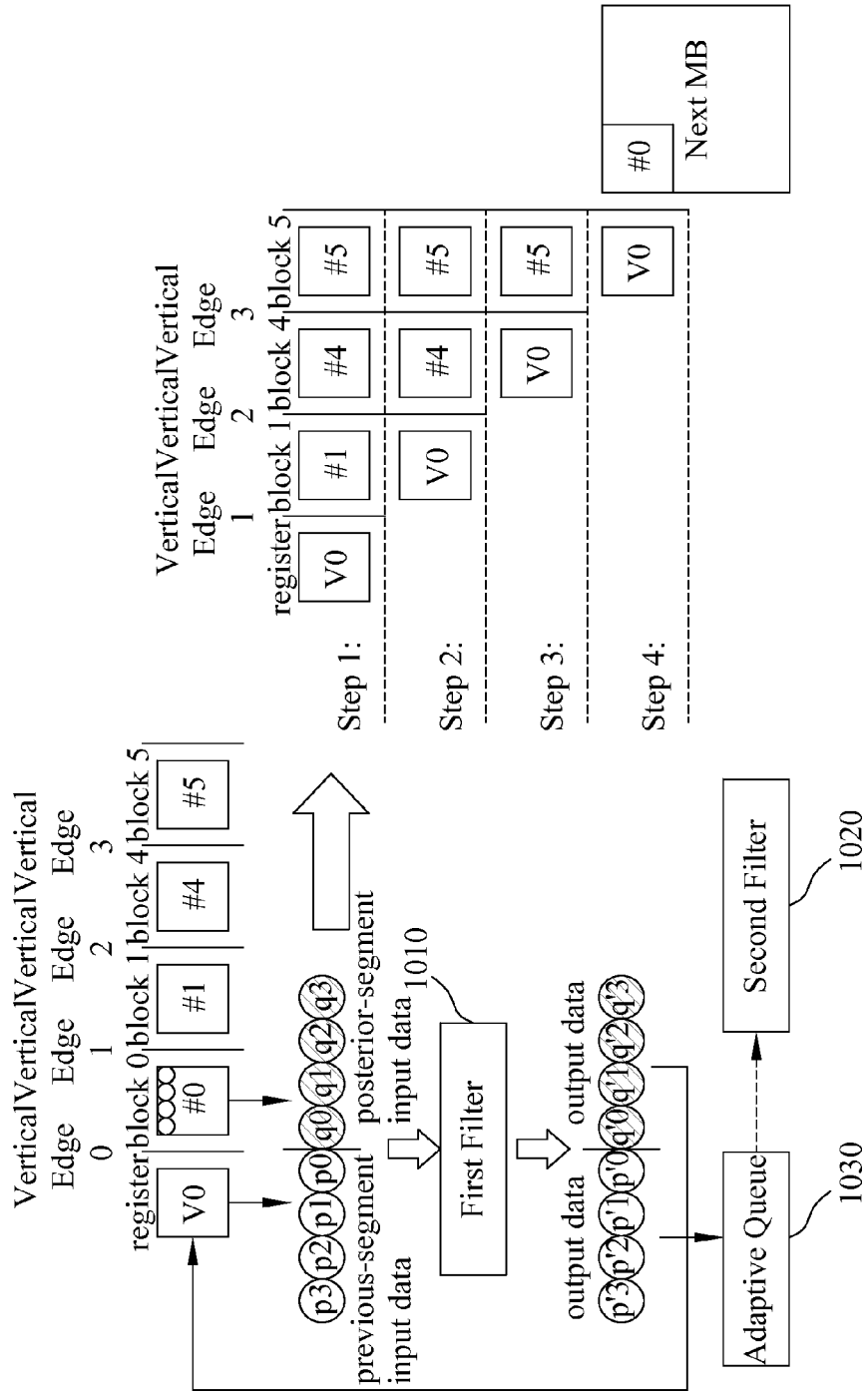
FIG. 22 shows an exemplary schematic view of an exemplar of using partial data of MB to reduce the buffer size, consistent with certain disclosed embodiments.

Take the filtering order of block edges of FIG. 17 and the registers used by 4:2:0 format in FIG. 19 as example. FIG. 22 shows how the partial data of MB is reused to reduce the size of the buffers, consistent with certain disclosed embodiments. As shown in FIG. 22, for register V0, after first filter 1010 processes vertical edge 0 (v0), output data {q'0, q'1, q'2, q'3} is restored to register V0 to become the previous-segment input data {p3, p2, p1, p0} required by first filter 1010 for processing v1; in other words, the same register is used to store the filtered data of current edge to be used as a portion of input data for processing the next edge. Hence, when processing v1, v2, v3, the data stored in register V0 is the previous-segment input data {p3, p2, p1, p0} for first filter 1010, and the data is reusable. In this manner, the data amount in the buffer is reduced and the output data {p'3, p'2, p'1, p'0} is written to adaptive queue 1030.

Figure 23:
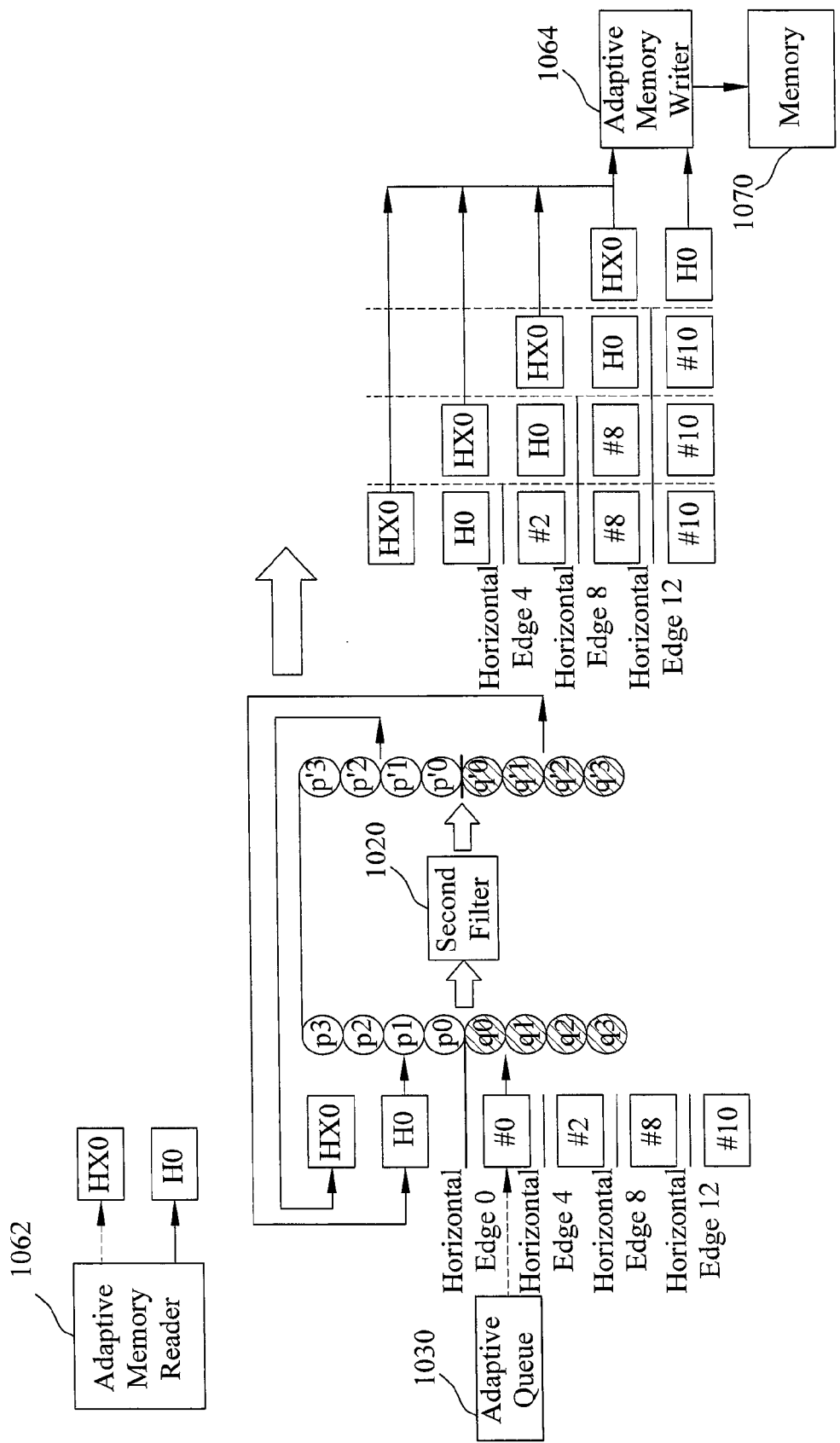
FIG. 23 shows an exemplary schematic view of an exemplar of sharing buffers to store data and provide the data to a memory and second filter simultaneously, consistent with certain disclosed embodiments.

FIG. 23 shows an exemplary schematic view of sharing buffers for storing data and providing the data to a memory and second filter 1020 simultaneously, consistent with certain disclosed embodiments. As shown in FIG. 23, before second filter 1020 processes any horizontal edge, registers H0-H7 and HX0-HX7 are used for storing any data read from memory 1070 by adaptive memory reader 1062. The data stored in registers H0-H7 and HX0-HX7 are used as the previous-segment input data {p3, p2, p1, p0} for second filter 1020. The next-segment input data {q0, q1, q2, q3} for second filter 1020 is from adaptive queue 1030.

Following aforementioned in FIG. 17, for register H0, after second filter 1020 processes horizontal edge 0 (h0), output data {p'3, p'2, p'1, p'0} is stored back to register HX0, and output data {q'0, q'1, q'2, q'3} is stored back to register H0 to become the previous-segment input data {p3, p2, p1, p0} required by second filter 1020 for processing h4. Therefore, when processing horizontal edges 4, 8, 12, the data stored in register H0 may be reused so as to reduce the data amount in buffer. After second filer 1020 processes h12, the filtered data of current edge is already stored in registers H0, HX0; therefore, registers H0, HX0 may be used as a temporary buffer for adaptive memory writer 1064. In other words, registers H0, HX0 are shared to store data read from memory 1070 and store filtered data to be written to memory 1070 by adaptive memory writer 1064.

Figure 24:
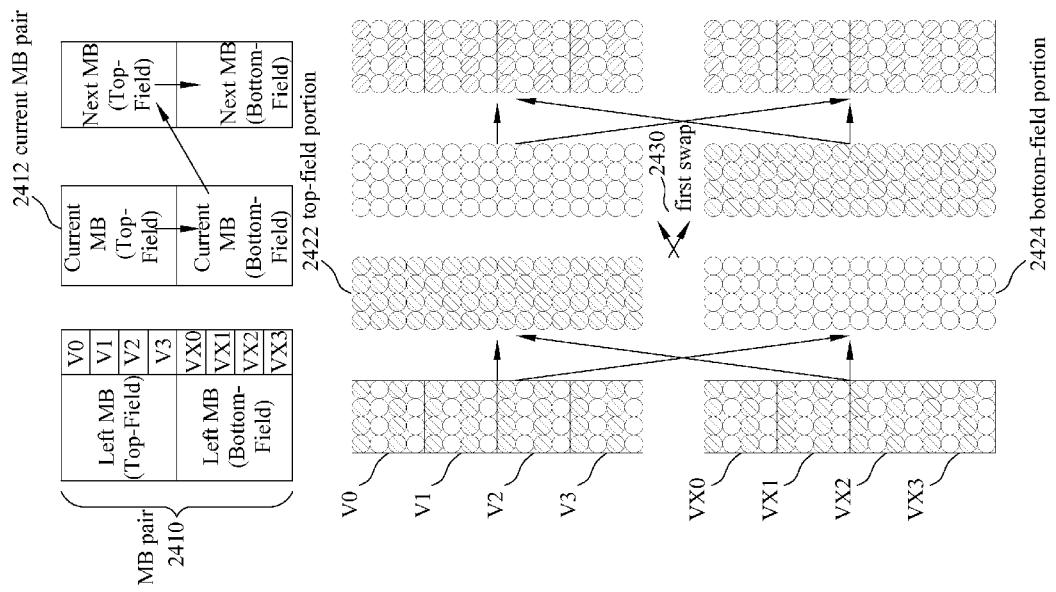
FIG. 24 shows an exemplary schematic view of data exchange and conversion capability between register groups, consistent with certain disclosed embodiments.

FIG. 24 shows an exemplary schematic view of the data swap and conversion capability between the register groups, consistent with certain disclosed embodiments. As shown in FIG. 24, registers V0-V3, VX0-VX3 contain the pixel data of MB pair 2410. MB pair 2410 is located to the left of current MB pair 2412. When MB pair 2412 uses field format, the data stored in registers V0-V3, VX0-VX3 is converted from frame format into field format. Therefore, the data stored in registers V0-V3, VX0-VX3 becomes top-field portion 2422 and bottom-field portion 2424, respectively.

If the current MB is a top-field MB, the data stored in registers V0-V3 will be used by first filter 1010. If the current MB is a bottom-field MB, the data stored in registers V0-V3 and the data stored in VX0-VX3 will first swap 2430, and then the data stored in registers V0-V3 will be used by first filter 1010. After first filter 1010 processes vertical edge of MB boundary, the data stored in registers V0-V3 and the data stored in registers VX0-VX3 are converted from field format into frame format. The data swap and data conversion is executed in a clock cycle, and may reduce the latency of data conversion because of format conversion.

Figure 25A:
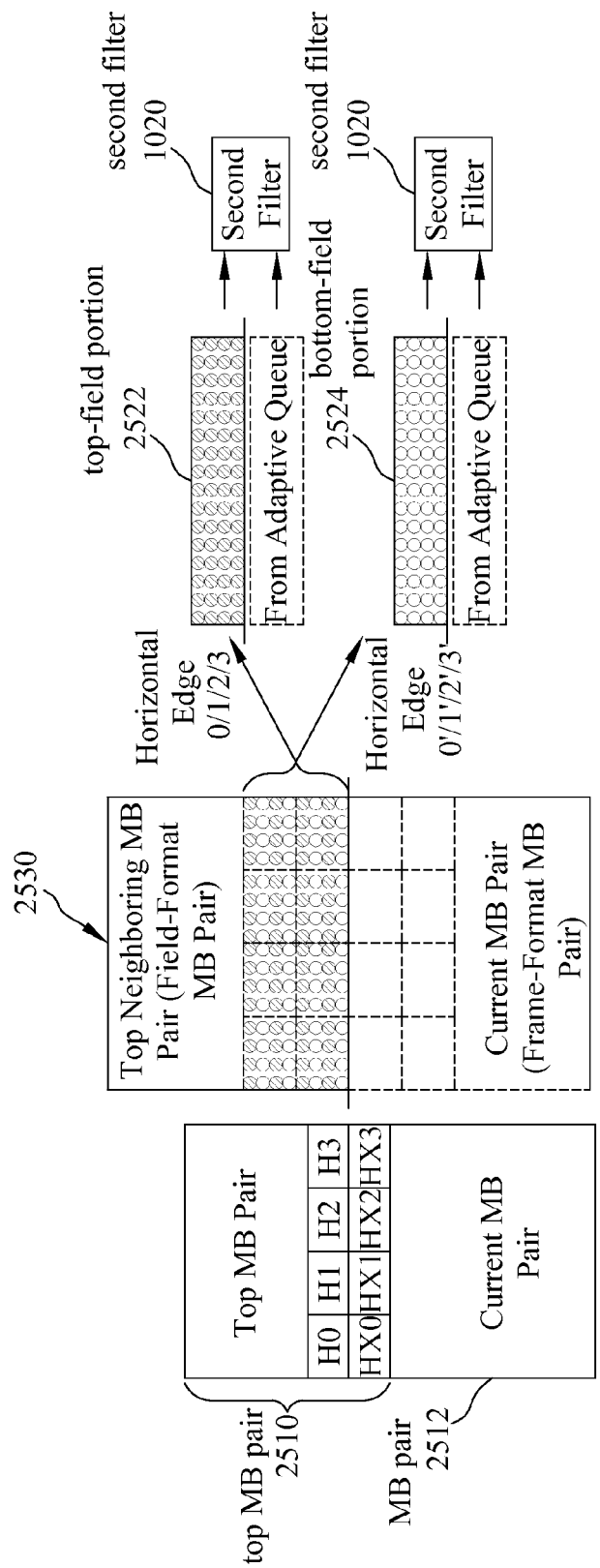
FIGS. 25A-25B show exemplary schematic views of using register groups for data conversion when deblocking filtering horizontal edges on MB of MBAFF format, consistent with certain disclosed embodiments.
Figure 25B:
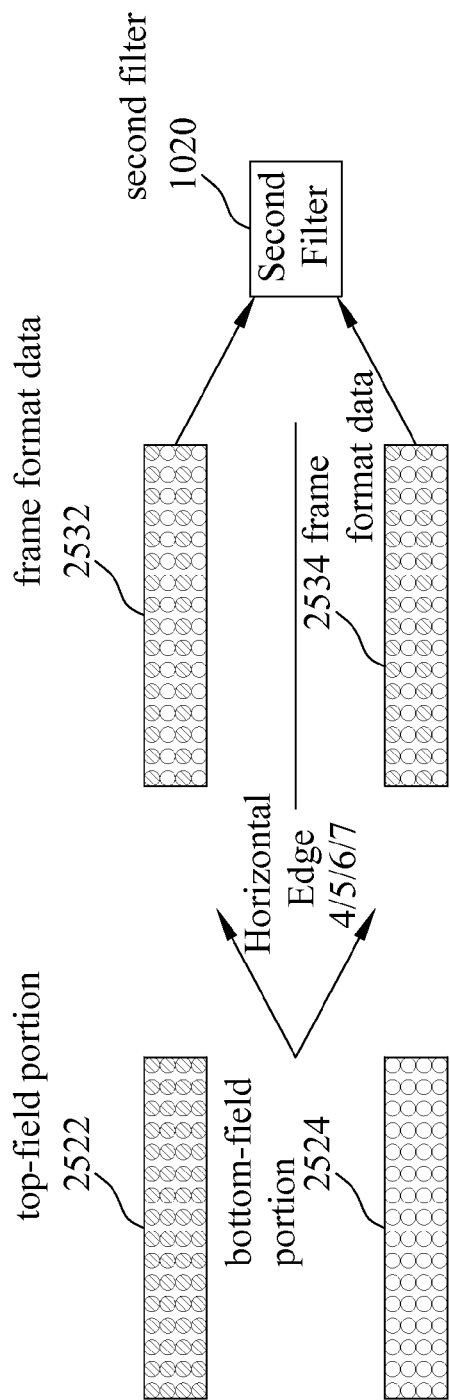

FIG. 25A-FIG. 25B further show exemplary schematic views of using register group for data conversion when deblocking filtering horizontal edges of MB using MBAFF format, consistent with certain disclosed embodiments. As shown in FIG. 25A, registers H0-H3, HX0-HX3 store pixel data of top MB pair 2510. Top MB pair 2510 is located at the top of current MB pair 2512. Marked as 2530, when MB pair 2512 uses frame format, the top neighboring MB pair 2510 uses field format, the data stored in registers H0-H3 (i.e. register group HREG) and HX0-HX3 (i.e., register group HREG_EXT) is converted from frame format into field format. Therefore, the data stored in registers H0-H3, HX0-HX3 becomes the top-field portion 2522 and the bottom-field portion 2524, respectively, as well as the input data when second filter 1020 processing horizontal edges h0, h1, h2, h3 and h0', h1', h2' h3'.

As shown in FIG. 25B, after second filter 1020 processes the horizontal edges h0, h1, h2, h3 and h0', h1', h2' h3', the data stored in registers H0-H3, HX0-HX3 (top-field portion 2522 and bottom-field portion 2524) is converted from field format into frame format data 2532, 2534. The converted frame format data is then used as input data for second filter 1020 for processing other horizontal edges of current MB.

In summary the deblocking filtering apparatus and method for video compression of the disclosed exemplary embodiments uses buffers to store partial data of MB required by two filters, and uses register groups to realize buffering function to improve the data exchange flexibility. The two filters of the deblocking filtering apparatus may perform vertical and horizontal deblocking filtering on the boundary data between blocks in a video sequence independently and simultaneously. The embodiments may reduce the number of times of memory accesses, improve the efficiency and throughput, as well as reduce the size of internal buffers for the deblocking filtering apparatus.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A deblocking filtering apparatus for video compression, for filtering a boundary blocking effect between blocks of a picture that uses macroblock adaptive frame-field (MBAFF) format, data in each vertical or horizontal edge of every two adjacent blocks is composed of pixel data of a previous segment and pixel data of a posterior segment, said apparatus comprising:

an adaptive queue, for storing filtered pixels of previous-segments of vertical edges, converting pixels in frame format to field format, and storing non-filtered pixels of posterior-segments of horizontal edges;

a first swap buffer, for storing non-filtered pixels of a left-neighboring macroblock pair, converting pixels in frame format to field format, storing non-filtered previous-segment pixels of vertical edges, storing filtered posterior-segment pixels of vertical edges, and converting pixels in field format to frame format after performing all vertical deblocking filtering processes;

a second swap buffer, for storing non-filtered pixels of a top-neighboring macroblock pair, converting pixels in frame format to field format, storing non-filtered previous-segments pixels of horizontal edges, storing full-segment filtered pixels of horizontal edges, converting pixels in field format to frame format after performing a first horizontal deblocking filtering process, and outputting a portion of filtered pixels to said first swap buffer after performing all horizontal deblocking filtering processes;

a first filter, for inputting a first previous-segment pixel data pre-stored in said first swap buffer, inputting non-filtered pixels of a current macroblock (MB) as a first posterior-segment pixel data, after performing a vertical deblocking filtering process, outputting a previous-segment filtered pixel data to said adaptive queue and outputting a posterior-segment filtered pixel data for restoring in said first swap buffer; and a second filter, for inputting a second previous-segment pixel data pre-stored in said second swap buffer, using output data from said adaptive queue as a second posterior-segment pixel data, after performing a horizontal deblocking filtering process, storing a full-segment filtered pixel data already outputted back to said second swap buffer.

2. The deblocking filtering apparatus as claimed in claim 1, wherein when said current MB uses a MB adaptive frame-field format, a portion of the filtered pixel data outputted by said second filter is stored back to said first swap buffer through said second swap buffer.

3. The deblocking filtering apparatus as claimed in claim 1, wherein initial data of said second swap buffer is provided by an adaptive memory reader reading from a memory, and the number of times said adaptive memory reader reads said memory is determined by a format of said current MB and at least a parameter provided by a parameter calculator.

4. The deblocking filtering apparatus as claimed in claim 1, wherein said first swap buffer and said second swap buffer are implemented with a plurality of first register groups and a plurality of second register groups.

5. The deblocking filtering apparatus as claimed in claim 4, wherein said plurality of first register groups and said second register groups have data swap and conversion capabilities.

6. The deblocking filtering apparatus as claimed in claim 4, said apparatus shares said plurality of first and second register groups to store data read from a memory and store filtered pixel data in said first and second swap buffers to be written to said memory by an adaptive memory writer, and the number of times said adaptive memory writer writes to said memory is determined by an output flag of said first and second filters.

7. The deblocking filtering apparatus as claimed in claim 4, wherein data required by said first filter is stored in said plurality of first register groups and data required by said second filter is stored in said plurality of second register groups.

8. The deblocking filtering apparatus as claimed in claim 1, wherein said first filter is connected to said adaptive queue and said first swap buffer respectively, and said second filter is connected to said adaptive queue and said second swap buffer respectively.

9. The deblocking filtering apparatus as claimed in claim 1, said apparatus generates at least a related parameter via a parameter calculator and provides to said first and second filters as at least an input parameter for processing deblocking filtering.

10. The deblocking filtering apparatus as claimed in claim 1, said apparatus further includes:
    an adaptive memory reader, for reading from a memory to provide initial data to said second swap buffer; and
    an adaptive memory writer, for writing filtered pixel data in said first and second swap buffers to said memory.

11. A deblocking filtering method for video compression, for deblocking filtering boundary blocks between blocks of a picture that uses macroblock adaptive frame-field (MBAFF) format, the data in each vertical or horizontal edge of every two adjacent blocks is composed of pixel data of a previous segment and pixel data of a posterior segment, said method comprising:
    converting non-filtered pixel data of a left-neighboring macroblock pair in frame format to field format by a first swap buffer if a current macroblock (MB) is in field format and said left-neighboring macroblock pair is in frame format;
    inputting a first previous-segment pixel data pre-stored in said first swap buffer, inputting non-filtered pixels of said current MB as a first posterior-segment pixel data;
    performing a vertical deblocking filtering process, outputting a previous-segment filtered pixel data to an adaptive queue and outputting a posterior-segment filtered pixel data to be stored back to said first swap buffer;
    converting said previous-segment filtered pixel data from said vertical deblocking filtering process in frame format to field format by said adaptive queue if said current MB is in frame format and a top-neighboring macroblock pair is in field format;
    converting non-filtered pixel data of said top-neighboring macroblock pair in frame format to field format by said second swap buffer if said current MB is in frame format and said top-neighboring macroblock pair is in field format;
    inputting a second previous-segment pixel data pre-stored in a second swap buffer, using output data from said adaptive queue as a second posterior-segment pixel data;
    performing a horizontal deblocking filtering process, storing a full-segment filtered pixel data already outputted back to said second swap buffer;
    converting said full-segment filtered pixel data in field format to frame format by said second swap buffer after performing a first horizontal deblocking filtering process if said current MB is in frame format and said top-neighboring macroblock pair is in field format;
    converting said posterior-segment filtered pixel data in field format to frame format by said first swap buffer after performing all vertical deblocking filtering processes if said current MB is in field format; and
    outputting a portion of said full-segment filtered pixel data by said second swap buffer to said first swap buffer after performing all horizontal deblocking filtering processes.

12. The deblocking filtering method as claimed in claim 11, said method further includes:
    using said first and second swap buffers to store partial data required by said vertical and horizontal deblocking filtering processes for said current MB, and using a plurality of register groups to implement buffering function to improve data exchange flexibility.

13. The deblocking filtering method as claimed in claim 12, said method further includes:
   sharing said plurality of register groups to store data read by an adaptive memory reader from a memory and store filtered pixel data in said first and second swap buffers to be written to said memory by an adaptive memory writer.

14. The deblocking filtering method as claimed in claim 13, wherein said memory further includes:
   number of times for said adaptive memory reader to read said memory being determined by a format of said current MB and at least a parameter provided by a parameter calculator; and
   number of times for said adaptive memory writer to write to said memory being determined by an output flag outputted by said vertical and horizontal deblocking filtering processes.

15. The deblocking filtering method as claimed in claim 11, said method further includes:
   performing said vertical and horizontal deblocking filtering processes via a first filter and a second filter.

16. The deblocking filtering method as claimed in claim 15, said method further includes:
   receiving partial data outputted by said first filter through said adaptive queue, and queuing said received data in at least an internal buffer;
   converting data from a format of said MB into another format required by said second filter through said adaptive queue, and outputting said converted data to said second filter; and
   using output data from said adaptive queue as a portion of input data to said second filter.

17. The deblocking filtering method as claimed in claim 15, said method further includes:
   after said first filter performing said vertical deblocking filtering process, storing filtered data of a current vertical edge in a register; and
   using said filtered data stored in said register as a portion of input data for processing next vertical edge.

18. The deblocking filtering method as claimed in claim 15, said method further includes:
   after said second filter performing said horizontal deblocking filtering process, storing filtered data of a current horizontal edge in a register; and
   using said filtered data stored in said register as a portion of input data for processing next horizontal edge.

* * * * *